(12) United States Patent
Henkin et al.

(10) Patent No.: US 9,710,818 B2
(45) Date of Patent: Jul. 18, 2017

(54) CONTEXTUAL ADVERTISING TECHNIQUES FOR IMPLEMENTED AT MOBILE DEVICES

(75) Inventors: Assaf Henkin, Tel Aviv (IL); Yoav Shaham, Raanana (IL); Itai Brickner, Tel Aviv (IL)

(73) Assignee: Kontera Technologies, Inc., Foster City, CA (US)

(*) Notice: Subject to any disclaimer, the term of this patent is extended or adjusted under 35 U.S.C. 154(b) by 1413 days.

(21) Appl. No.: 12/295,854

(22) PCT Filed: Apr. 2, 2007

(86) PCT No.: PCT/US2007/008042
§ 371 (c)(1),
(2), (4) Date: Feb. 22, 2010

(87) PCT Pub. No.: WO2007/123783
PCT Pub. Date: Nov. 1, 2007

(65) Prior Publication Data
US 2010/0174607 A1    Jul. 8, 2010

Related U.S. Application Data

(60) Provisional application No. 60/789,118, filed on Apr. 3, 2006.

(51) Int. Cl.
| | |
|---|---|
| G06F 15/177 | (2006.01) |
| G06Q 30/02 | (2012.01) |
| H04L 29/08 | (2006.01) |

(52) U.S. Cl.
CPC ......... *G06Q 30/02* (2013.01); *G06Q 30/0255* (2013.01); *G06Q 30/0267* (2013.01); *H04L 67/28* (2013.01); *H04L 67/2838* (2013.01)

(58) Field of Classification Search
USPC ........................... 715/738, 745, 746
See application file for complete search history.

(56) References Cited

U.S. PATENT DOCUMENTS

| | | | |
|---|---|---|---|
| 5,603,025 A | 2/1997 | Tabb et al. | |
| 5,636,346 A | 6/1997 | Saxe | |

(Continued)

FOREIGN PATENT DOCUMENTS

| | | |
|---|---|---|
| EP | 1030247 A2 | 8/2000 |
| EP | 2054789 A2 | 5/2009 |
| WO | WO9955066 A1 | 10/1999 |
| WO | WO01/86390 A2 | 11/2001 |

(Continued)

OTHER PUBLICATIONS

"U.S. Appl. No. 11/732,694, Response filed Aug. 3, 11 to Final Office Action mailed Apr. 28, 2011", 11 pgs.

(Continued)

*Primary Examiner* — Thanh Vu
(74) *Attorney, Agent, or Firm* — Schwegman Lundberg & Woessner, P.A.

(57) ABSTRACT

Various techniques are disclosed for delivering contextual advertising information to end users of a data network via a mobile device. At least one operation may be initiated to determine the features, capabilities and/or services supported at an identified mobile device. A first contextual advertising delivery technique may be implemented in response to a determination that a first type of functionality is supported at the identified mobile device. A second contextual advertising delivery technique may be implemented in response to a determination that the first type of functionality is not supported at the identified mobile device.

14 Claims, 13 Drawing Sheets

(56) References Cited

U.S. PATENT DOCUMENTS

| | | |
|---|---|---|
| 5,692,132 A | 11/1997 | Hogan |
| 5,693,132 A | 12/1997 | Kluttz et al. |
| 5,694,594 A | 12/1997 | Chang |
| 5,710,884 A | 1/1998 | Dedrick |
| 5,710,887 A | 1/1998 | Chelliah et al. |
| 5,712,979 A | 1/1998 | Graber et al. |
| 5,717,860 A | 2/1998 | Graber et al. |
| 5,717,923 A | 2/1998 | Dedrick |
| 5,721,827 A | 2/1998 | Logan et al. |
| 5,724,424 A | 3/1998 | Gifford |
| 5,724,521 A | 3/1998 | Dedrick |
| 5,727,156 A | 3/1998 | Herr-Hoyman et al. |
| 5,737,619 A | 4/1998 | Judson |
| 5,740,549 A | 4/1998 | Reilly et al. |
| 5,751,956 A | 5/1998 | Kirsch |
| 5,751,969 A | 5/1998 | Kapoor |
| 5,757,917 A | 5/1998 | Rose et al. |
| 5,764,906 A | 6/1998 | Edelstein et al. |
| 5,774,170 A | 6/1998 | Hite et al. |
| 5,815,830 A | 9/1998 | Anthony |
| 5,822,539 A | 10/1998 | van Hoff |
| 5,826,025 A | 10/1998 | Gramlich |
| 5,848,396 A | 12/1998 | Gerace |
| 5,848,397 A | 12/1998 | Marsh et al. |
| 5,895,461 A | 4/1999 | De La Huerga et al. |
| 5,903,889 A | 5/1999 | De La Huerga et al. |
| 5,933,811 A | 8/1999 | Angles et al. |
| 5,948,061 A | 9/1999 | Merriman et al. |
| 5,959,623 A | 9/1999 | van Hoff et al. |
| 5,995,943 A | 11/1999 | Bull et al. |
| 6,041,311 A | 3/2000 | Chislenko et al. |
| 6,044,376 A | 3/2000 | Kurtzman, II |
| 6,061,659 A | 5/2000 | Murray |
| 6,073,143 A | 6/2000 | Nishikawa et al. |
| 6,081,829 A | 6/2000 | Sidana |
| 6,092,074 A | 7/2000 | Rodkin et al. |
| 6,098,065 A | 8/2000 | Skillen et al. |
| 6,122,647 A | 9/2000 | Horowitz et al. |
| 6,134,532 A | 10/2000 | Lazarus et al. |
| 6,141,010 A | 10/2000 | Hoyle |
| 6,144,944 A | 11/2000 | Kurtzman, II et al. |
| 6,256,631 B1 | 7/2001 | Malcolm |
| 6,266,681 B1 | 7/2001 | Guthrie |
| 6,285,987 B1 | 9/2001 | Roth et al. |
| 6,295,542 B1 | 9/2001 | Corbin |
| 6,311,194 B1 | 10/2001 | Sheth et al. |
| 6,317,781 B1 | 11/2001 | De Boor et al. |
| 6,321,257 B1 | 11/2001 | Kotola et al. |
| 6,334,145 B1 | 12/2001 | Adams et al. |
| 6,421,733 B1 | 7/2002 | Tso et al. |
| 6,434,657 B1 | 8/2002 | Brown |
| 6,466,970 B1 | 10/2002 | Lee et al. |
| 6,507,837 B1 | 1/2003 | De La Huerga et al. |
| 6,516,321 B1 | 2/2003 | De La Huerga et al. |
| 6,578,078 B1 | 6/2003 | Smith et al. |
| 6,581,065 B1 | 6/2003 | Rodkin et al. |
| 6,591,248 B1 | 7/2003 | Nakamura et al. |
| 6,606,652 B1 | 8/2003 | Cohn et al. |
| 6,647,364 B1 | 11/2003 | Yumura et al. |
| 6,725,227 B1 | 4/2004 | Li |
| 6,742,163 B1 | 5/2004 | Ono et al. |
| 6,748,385 B1 | 6/2004 | Rodkin et al. |
| 6,757,661 B1 | 6/2004 | Blaser et al. |
| 6,785,740 B1 | 8/2004 | Yoneda et al. |
| 6,792,430 B1 | 9/2004 | Kenyon et al. |
| 6,848,077 B1 | 1/2005 | McBrearty et al. |
| 6,862,710 B1 | 3/2005 | Marchisio |
| 6,968,332 B1 | 11/2005 | Milic-Frayling et al. |
| 7,110,993 B2 | 9/2006 | Soulanille et al. |
| 7,149,698 B2 | 12/2006 | Guheen et al. |
| 7,165,041 B1 | 1/2007 | Guheen et al. |
| 7,257,585 B2 | 8/2007 | Stevenson et al. |
| 7,284,008 B2 | 10/2007 | Henkin et al. |
| 7,313,588 B1 | 12/2007 | Shotton et al. |
| 7,315,826 B1 | 1/2008 | Guheen et al. |
| 7,437,725 B1 | 10/2008 | Chang et al. |
| 7,451,099 B2 | 11/2008 | Henkin et al. |
| 7,464,381 B1 | 12/2008 | Nickerson et al. |
| 7,478,089 B2 | 1/2009 | Henkin et al. |
| 7,493,553 B1 | 2/2009 | Vora et al. |
| 7,818,319 B2 | 10/2010 | Henkin et al. |
| 7,822,636 B1 | 10/2010 | Ferber et al. |
| 7,822,743 B2 | 10/2010 | Henkin et al. |
| 7,827,174 B2 | 11/2010 | Henkin et al. |
| 8,694,480 B2 | 4/2014 | Henkin et al. |
| 8,700,588 B2 | 4/2014 | Henkin et al. |
| 9,324,084 B2 | 4/2016 | Henkin et al. |
| 2001/0018704 A1 | 8/2001 | Kikugawa |
| 2002/0035619 A1 | 3/2002 | Dougherty et al. |
| 2002/0035697 A1 | 3/2002 | McCurdy et al. |
| 2002/0052925 A1 | 5/2002 | Kim et al. |
| 2002/0065136 A1 | 5/2002 | Day |
| 2002/0087979 A1 | 7/2002 | Dudkiewicz et al. |
| 2002/0107735 A1 | 8/2002 | Henkin et al. |
| 2002/0111865 A1 | 8/2002 | Middleton |
| 2002/0120505 A1 | 8/2002 | Henkin et al. |
| 2002/0123912 A1 | 9/2002 | Subramanian et al. |
| 2002/0143808 A1 | 10/2002 | Miller et al. |
| 2003/0055831 A1 | 3/2003 | Ryan et al. |
| 2003/0208472 A1 | 11/2003 | Pham |
| 2003/0208483 A1 | 11/2003 | Satomi et al. |
| 2004/0044571 A1 | 3/2004 | Bronnimann et al. |
| 2004/0059708 A1 | 3/2004 | Dean et al. |
| 2004/0073568 A1 | 4/2004 | Yonaha |
| 2004/0083211 A1 | 4/2004 | Bradford |
| 2004/0093327 A1 | 5/2004 | Anderson et al. |
| 2004/0260767 A1* | 12/2004 | Kedem et al. ............... 709/203 |
| 2005/0004909 A1 | 1/2005 | Stevenson et al. |
| 2005/0033641 A1 | 2/2005 | Jha et al. |
| 2005/0137939 A1 | 6/2005 | Calabria et al. |
| 2005/0149395 A1 | 7/2005 | Henkin et al. |
| 2006/0095281 A1 | 5/2006 | Chickering et al. |
| 2006/0242009 A1* | 10/2006 | Crolley ................. G06Q 30/02 705/14.64 |
| 2006/0293951 A1 | 12/2006 | Patel et al. |
| 2007/0005421 A1 | 1/2007 | Labio et al. |
| 2007/0118803 A1 | 5/2007 | Walker et al. |
| 2007/0143266 A1 | 6/2007 | Tang et al. |
| 2008/0016059 A1 | 1/2008 | Henkin et al. |
| 2008/0016109 A1 | 1/2008 | Henkin et al. |
| 2008/0046415 A1 | 2/2008 | Henkin et al. |
| 2008/0114755 A1 | 5/2008 | Wolters et al. |
| 2008/0228675 A1 | 9/2008 | Duffy et al. |
| 2008/0250060 A1 | 10/2008 | Grois |
| 2009/0012869 A1 | 1/2009 | Henkin et al. |
| 2009/0024719 A1* | 1/2009 | Wyler et al. ............... 709/219 |
| 2009/0031311 A1 | 1/2009 | Chang et al. |
| 2009/0048978 A1 | 2/2009 | Ginter et al. |
| 2009/0164949 A1 | 6/2009 | Henkin et al. |
| 2009/0254971 A1 | 10/2009 | Herz et al. |
| 2010/0138271 A1 | 6/2010 | Henkin et al. |
| 2010/0138451 A1 | 6/2010 | Henkin et al. |
| 2010/0138452 A1 | 6/2010 | Henkin et al. |
| 2011/0035438 A1 | 2/2011 | Henkin et al. |
| 2011/0035439 A1 | 2/2011 | Henkin et al. |
| 2011/0035440 A1 | 2/2011 | Henkin et al. |
| 2011/0166677 A1* | 7/2011 | Bromley et al. ............... 700/83 |
| 2011/0213655 A1 | 9/2011 | Henkin et al. |

FOREIGN PATENT DOCUMENTS

| | | |
|---|---|---|
| WO | WO-0219175 A2 | 3/2002 |
| WO | 2005/003920 A2 | 1/2005 |
| WO | WO-2005025252 A2 | 3/2005 |
| WO | WO-2005094098 A1 | 10/2005 |
| WO | WO-2007123783 A2 | 11/2007 |
| WO | WO-2007123783 A3 | 11/2007 |
| WO | WO-2010085773 A1 | 7/2010 |

OTHER PUBLICATIONS

"U.S. Appl. No. 11/732,694, Non-Final Office Action mailed Sep. 16, 2010", 25 pgs.

(56) References Cited

OTHER PUBLICATIONS

"U.S. Appl. No. 11/732,694, Advisory Action mailed Jul. 21, 2011", 3 pgs.
"U.S. Appl. No. 11/732,694, Final Office Action mailed Apr. 28, 2011", 26 pgs.
"U.S. Appl. No. 11/732,694, Response filed May 23, 2011 to Final Office Action mailed Apr. 28, 2011", 13 pgs.
"U.S. Appl. No. 11/732,694, Response filed Aug. 24, 2010 to Restriction Requirement mailed Jun. 24, 2010", 8 pgs.
"U.S. Appl. No. 11/732,694, Response filed Feb. 16, 2011 to Non Final Office Action mailed Sep. 16, 2010", 13 pgs.
"U.S. Appl. No. 11/732,694, Restriction Requirement mailed Jun. 24, 2010", 7 pgs.
"U.S. Appl. No. 11/881,430, Notice of Allowance mailed Jun. 1, 2010", 7 pgs.
"U.S. Appl. No. 11/891,435, Restriction Requirement mailed Sep. 16, 2010", 7 pgs.
"U.S. Appl. No. 11/891,435, Final Office Action mailed Aug. 19, 2011", 21 pgs.
"U.S. Appl. No. 11/891,435, Non Final Office Action mailed Feb. 22, 2011", 14 pgs.
"U.S. Appl. No. 11/891,435, Response filed May 23, 2011 to Non Final Office Action mailed Feb. 22, 2011", 11 pgs.
"U.S. Appl. No. 11/891,436, Notice of Allowance mailed Jun. 18, 2010", 7 pgs.
"U.S. Appl. No. 11/891,436, Response Filed May 19, 2010 to Final Office Action mailed Mar. 19, 2010", 14 pgs.
"U.S. Appl. No. 11/891,437, Restriction Requirement mailed Sep. 16, 2010", 7 pgs.
"U.S. Appl. No. 11/891,437, Final Office Action mailed Aug. 19, 2011", 23 pgs.
"U.S. Appl. No. 11/891,437, Non Final Office Action mailed Feb. 23, 2011", 10 pgs.
"U.S. Appl. No. 11/891,437, Response filed May 23, 2011 to Non Final Office Action mailed Feb. 23, 2011", 7 pgs.
"U.S. Appl. No. 11/891,578, Amendment B, filed May 30, 2009", 17 pgs.
"U.S. Appl. No. 11/891,578, Non Final Office Action mailed May 29, 2009", 10 pgs.
"U.S. Appl. No. 11/891,578, Notice of Allowance mailed Jun. 1, 2010", 7 pgs.
"U.S. Appl. No. 11/891,578, Preliminary Amendment filed Oct. 2, 2007", 1 pg.
"U.S. Appl. No. 12/212,512, Non Final Office Action mailed May 3, 2011", 14 pgs.
"U.S. Appl. No. 12/212,512, Non-Final Office Action mailed Oct. 1, 2010", 5 pgs.
"U.S. Appl. No. 12/212,512, Response filed Feb. 24, 2011 to Non Final Office Action mailed Oct. 1, 2010", 11 pgs.
"U.S. Appl. No. 12/340,464, Non Final Office Action mailed Mar. 31, 2011", 8 pgs.
"International Application Serial No. PCT/US2010/022021, International Preliminary Report on Patentability mailed Aug. 4, 2011", 7 pgs.
"International Application Serial No. PCT/US2010/022021, International Search Report and Written Opinion mailed Mar. 9, 2010".
Challenger, Jim, et al., ""A scalable and highly available system for serving dynamic data at frequently accessed web sites"", ACM, (Nov. 1998), 1-30 pages.
Kobayashi, Mei, et al., ""Information Retrieval on the Web"", ACM, (Jun. 2000,), pp. 144-173.
Marshall, Catherine, et al., "Spatial Hypertext: Designing for Change", ACM, (Aug. 1995), pp. 88-97.
"U.S. Appl. No. 09/943,524, Amendment A filed Jan. 18, 2005", 17 pgs.
"U.S. Appl. No. 09/943,524, Amendment B filed Aug. 10, 2005", 16 pgs.
"U.S. Appl. No. 09/943,524, Amendment C filed Feb. 14, 2006", 22 pgs.
"U.S. Appl. No. 09/943,524, Amendment D filed Aug. 22, 2006", 6 pgs.
"U.S. Appl. No. 09/943,524, Interview Summary dated Feb. 2, 2006", 2 pgs.
"U.S. Appl. No. 09/943,524, Interview Summary dated Oct. 13, 2006", 3 pgs.
"U.S. Appl. No. 09/943,524, Interview Summary mailed Jan. 19, 2005", 1 pg.
"U.S. Appl. No. 09/943,524, Interview Summary mailed Jul. 7, 2005", 1 pg.
"U.S. Appl. No. 09/943,524, Supplemental Amendment filed Oct. 12, 2006", 29 pgs.
"U.S. Appl. No. 09/943,571, Amendment filed Apr. 15, 2008 in response to Non-Final Office Action mailed Oct. 15, 2007", 23 pgs.
"U.S. Appl. No. 09/943,571, Interview Summary mailed May 9, 2008", 3 pgs.
"U.S. Appl. No. 09/943,571, Interview Summary mailed Aug. 11, 2008", 5 pgs.
"U.S. Appl. No. 09/943,571, Preliminary Amendment filed Mar. 19, 2007", 7 pgs.
"U.S. Appl. No. 09/943,571, Response to Restriction Requirement, filed Aug. 30, 2007", 6 pgs.
"U.S. Appl. No. 09/943,571, Restriction Requirement mailed Jan. 25, 2007", 1 pg.
"U.S. Appl. No. 10/977,352, Amendment filed Jul. 25, 2008 to Final Office Action mailed Feb. 5, 2008", 13 pgs.
"U.S. Appl. No. 10/977,352, Amendment filed Nov. 8, 2007 to Non-Final Office Action mailed May 11, 2007", 13 pgs.
"U.S. Appl. No. 11/881,430, Amendment B fled Nov. 30, 2006", 23 pgs.
"U.S. Appl. No. 11/881,430, Final Office Action mailed Feb. 18, 2010", 6 pgs.
"U.S. Appl. No. 11/881,430, Non-Final Office Action mailed May 29, 2009", 10 pgs.
"U.S. Appl. No. 11/881,430, Preliminary Amendment (Amendment A) filed Oct. 2, 2007", 5 pgs.
"U.S. Appl. No. 11/881,430, Response filed Apr. 14, 2010 to Final Office Action mailed Feb. 18, 2010", 9 pgs.
"U.S. Appl. No. 11/891,436, Amendment A filed Nov. 26, 2009 to Non-Final Office Action mailed May 27, 2009", 21 pgs.
"U.S. Appl. No. 11/891,436, Final Office Action mailed Mar. 19, 2010", 6 pgs.
"U.S. Appl. No. 11/891,436, Non-Final Office Action mailed May 27, 2009", 10 pgs.
"U.S. Appl. No. 11/891,578, Final Office Action mailed Feb. 18, 2010", 5 pgs.
"U.S. Appl. No. 11/891,578, Response filed Apr. 14, 2010 to Final Office Action mailed Feb. 18, 2010", 11 pgs.
Baldwin, Paul, "Feed the information bug with Flyswat", [Online] http://articles.techrepublic.com.com/5100-10878_11-5032179. html, (Published on Feb. 22, 2000 and accessed on Apr. 5, 2010), 6 pgs.
Lemay, Laura, "Teach Yourself Web Publishing with HTML 4 in 14 Days", © 1997 by Sams.net Publishing, Second Professional Referenced Edition, pp. 637-651.
Office Action, mailed Aug. 23, 2004, U.S. Appl. No. 09/943,524, Henkin et al., filed Aug. 29, 2001.
Office Action, mailed May 13, 2005, U.S. Appl. No. 09/943,524, Henkin et al. filed Aug. 29, 2001.
Office Action, mailed May 2, 2006, U.S. Appl. No. 09/943,524, Henkin et al., filed Aug. 29, 2001.
Office Action, mailed Nov. 21, 2005, U.S. Appl. No. 09/943,524, Henkin et al., filed Aug. 29, 2001.
Notice of Allowance mailed on Jul. 25, 2007 in U.S. Appl. No. 09/943,524.
U.S. Office Action mailed May 11, 2007, for U.S. Appl. No. 10/977,352, Henkin et al., filed Oct. 28, 2004.
U.S. Final Office Action mailed Feb. 5, 2008 for U.S. Appl. No. 10/977,352, Henkin et al., filed Oct. 28, 2004.
Notice of Allowance mailed Sep. 29, 2008 in U.S. Appl. No. 10/977,352.
Allowed Claims for U.S. Appl. No. 10/977,352.

(56) References Cited

OTHER PUBLICATIONS

U.S. Office Action mailed Oct. 15, 2007, for U.S. Appl. No. 09/943,571, Henkin et al., filed Aug. 29, 2001.
Notice of Allowance mailed on Aug. 21, 2008 in U.S. Appl. No. 09/943,571, filed Aug. 29, 2001.
Allowed Claims for U.S. Appl. No. 09/943,571, filed Aug. 29, 2001.
International Search Report and Written Opinion for PCT/US07/08042 dated Sep. 19, 2008.
Response to Examiner's Provisional Obviousness-Type Double Patenting Rejection filed on Aug. 12, 2008 in U.S. Appl. No. 09/943,571.
"U.S. Appl. No. 09/542,496, Non-Final Office Action mailed Jul. 9, 2002", 13 pgs.
"U.S. Appl. No. 11/891,435, Response filed Feb. 18, 2011 to Restriction Requirement mailed Sep. 16, 2010", 5 pgs.
"U.S. Appl. No. 11/891,435, Response filed Feb. 21, 2012 to Final Office Action mailed Aug. 19, 2011", 11 pgs.
"U.S. Appl. No. 11/891,437, Response filed Jan. 18, 2011 to Restriction Requirement mailed Sep. 16, 2010", 4 pgs.
"U.S. Appl. No. 11/891,437, Response filed Feb. 21, 2012 to Final Office Action mailed Aug. 9, 2011", 9 pgs.
"U.S. Appl. No. 12/212,512, Final Office Action mailed Dec. 5, 2011", 20 pgs.
"U.S. Appl. No. 12/212,512, Response filed Nov. 3, 2011 to Non Final Office Action mailed May 3, 2011", 12 pgs.
"U.S. Appl. No. 12/340,464, Non Final Office Action mailed Oct. 31, 2011", 9 pgs.
"U.S. Appl. No. 12/340,464, Response filed Aug. 31, 2011 to Non Final Office Action mailed Mar. 31, 2011", 6 pgs.
"U.S. Appl. No. 12/693,433 , Response filed Dec. 9, 2013 to Final Office Action mailed Nov. 9, 2012", 14 pgs.
"U.S. Appl. No. 12/693,433, Decision on Pre-Appeal Brief Request mailed May 24, 2013", 2 pgs.
"U.S. Appl. No. 12/693,433, Final Office Action mailed Nov. 9, 2012", 34 pgs.
"U.S. Appl. No. 12/693,433, Non Final Office Action mailed Feb. 27, 2012", 37 pgs.
"U.S. Appl. No. 12/693,433, Pre-Appeal Brief Request filed May 9, 2013", 5 pgs.
"U.S. Appl. No. 12/693,433, Preliminary Amendment filed Jan. 27, 2011", 12 pgs.
"U.S. Appl. No. 12/693,433, Response filed Aug. 27, 2012 to Non Final Office Action mailed Feb. 27, 2012", 14 pgs.
"U.S. Appl. No. 12/907,183, Examiner Interview Summary mailed Mar. 5, 2013", 3 pgs.
"U.S. Appl. No. 12/907,183, Final Office Action mailed Oct. 17, 2012", 25 pgs.
"U.S. Appl. No. 12/907,183, Non Final Office Action mailed Mar. 8, 2012", 22 pgs.
"U.S. Appl. No. 12/907,183, Non Final Office Action mailed Jul. 5, 2013", 23 pgs.
"U.S. Appl. No. 12/907,183, Preliminary Amendment filed Oct. 19, 2010", 5 pgs.
"U.S. Appl. No. 12/907,183, Response filed Jan. 6, 2014 to Non Final Office Action mailed Jul. 5, 2013", 12 pgs.
"U.S. Appl. No. 12/907,183, Response filed Apr. 12, 2013 to Final Office Action mailed Oct. 17, 2012", 12 pgs.
"U.S. Appl. No. 12/907,183, Response filed Aug. 8, 2012 to Non Final Office Action mailed Mar 8, 2012", 10 pgs.
"U.S. Appl. No. 12/907,183, Supplemental Preliminary Amendment filed Feb. 4, 2011", 8 pgs.
"U.S. Appl. No. 12/910,264, Examiner Interview Summary mailed Mar. 5, 2013", 3 pgs.
"U.S. Appl. No. 12/910,264, Final Office Action mailed Sep. 24, 2012", 20 pgs.
"U.S. Appl. No. 12/910,264, Non Final Office Action mailed Mar. 8, 2012", 19 pgs.
"U.S. Appl. No. 12/910,264, Non Final Office Action mailed Apr. 12, 2013", 21 pgs.
"U.S. Appl. No. 12/910,264, Notice of Allowance mailed Nov. 19, 2013", 11 pgs.
"U.S. Appl. No. 12/910,264, Preliminary Amendment filed Oct. 22, 2010", 5 pgs.
"U.S. Appl. No. 12/910,264, Response filed Mar. 25, 2013 to Final Office Action mailed Sep. 24, 2012", 12 pgs.
"U.S. Appl. No. 12/910,264, Response filed Aug. 8, 2012 to Non Final Office Action mailed Mar. 8, 2012", 14 pgs.
"U.S. Appl. No. 12/910,264, Response filed Oct. 15, 2013 to Non Final Office Action mailed Apr. 12, 2013", 11 pgs.
"U.S. Appl. No. 12/910,264, Supplemental Preliminary Amendment filed Feb. 4, 2011", 8 pgs.
"U.S. Appl. No. 12/910,337 , Response filed Oct. 15, 2013 to Non Final Office Action mailed Apr. 12, 2013", 11 pgs.
"U.S. Appl. No. 12/910,337, Examiner Interview Summary mailed Mar. 5, 2013", 3 pgs.
"U.S. Appl. No. 12/910,337, Final Office Action mailed Oct. 18, 2012", 15 pgs.
"U.S. Appl. No. 12/910,337, Non Final Office Action mailed Mar. 8, 2012", 13 pgs.
"U.S. Appl. No. 12/910,337, Non Final Office Action mailed Apr. 12, 2013", 15 pgs.
"U.S. Appl. No. 12/910,337, Notice of Allowance mailed Nov. 15, 2013", 10 pgs.
"U.S. Appl. No. 12/910,337, Preliminary Amendment filed Oct. 22, 2010", 5 pgs.
"U.S. Appl. No. 12/910,337, Response filed Apr. 2, 2013 to Final Office Action mailed Oct. 18, 2012", 10 pgs.
"U.S. Appl. No. 12/910,337, Response filed Aug. 8, 2012 to Non Final Office Action mailed Mar. 8, 2012", 10 pgs.
"U.S. Appl. No. 12/910,337, Supplemental Preliminary Amendment filed Feb. 4, 2011", 8 pgs.
"European Application Serial No. 07754552.3, Extended European Search Report mailed Dec. 14, 2012", 5 pgs.
"European Application Serial No. 07754552.3, Office Action mailed Jan. 2, 2013", 1 pg.
"Semantic advertising", [Online] Retrieved From Internet: <http://en.wikipedia.org/wiki/semantic_advertising>, (2008).
Dougherty, C. D., et al., "Electronic Contextual Commerce System", U.S. Appl. No. 09/631,439, filed Aug. 2, 2000, 59 pgs.
Liu, Xueqing, et al., "Automatic Taxonomy Construction from Keywords", (1999).
Yih, Wen-Tau, et al., "Finding advertising keywords on web pages", Proceedings of the 15th International Conference on World Wide Web, (2006), 213-222.
U.S. Appl. No. 11/732,694, Non Final Office Action mailed Apr. 7, 2014, 46 pgs.
U.S. Appl. No. 11/732,694, Non Final Office Action mailed Nov. 12, 2014, 34 pgs.
U.S. Appl. No. 11/732,694, Response filed Oct. 7, 2014 to Non Final Office Action mailed Apr. 7, 2014, 12 pgs.
U.S. Appl. No. 11/891,435, Non Final Office Action mailed Apr. 8, 2014, 38 pgs.
U.S. Appl. No. 11/891,435, Response filed Oct. 8, 2014 to Non Final Office Action mailed Apr. 8, 2014, 10 pgs.
U.S. Appl. No. 11/891,435, Response filed Dec. 29, 2014 to Non Final Office Action mailed Apr. 8, 2014, 10 pgs.
U.S. Appl. No. 11/891,437, Non Final Office Action mailed Apr. 7, 2014, 27 pgs.
U.S. Appl. No. 11/891,437, Non Final Office Action mailed Nov. 12, 2014, 24 pgs.
U.S. Appl. No. 11/891,437, Response filed Oct. 7, 2014 to Non Final Office Action mailed Apr. 7, 2014, 8 pgs.
U.S. Appl. No. 12/907,183, Final Office Action mailed Mar. 17, 2014, 24 pgs.
U.S. Appl. No. 12/907,183, Non Final Office Action mailed Nov. 25, 2014, 24 pgs.
U.S. Appl. No. 12/907,183, Response filed Sep. 17, 2014 to Final Office Action mailed Mar. 17, 2014, 12 pgs.
U.S. Appl. No. 11/732,694, Response filed May 12, 2015 to Non Final Office Action mailed Nov. 12, 2014, 32 pgs.
U.S. Appl. No. 11/891,435, Non Final Office Action mailed Mar. 4, 1015, 37 pgs.

(56) References Cited

OTHER PUBLICATIONS

U.S. Appl. No. 11/891,437, Response filed May 12, 2015 to Non Final Office Action mailed Nov. 12, 2014, 27 pgs.
U.S. Appl. No. 12/693,433, Non Final Office Action mailed Apr. 7, 2015, 33 pgs.
U.S. Appl. No. 12/907,183, Response filed May 26, 2015 to Non Final Office Action mailed Nov. 25, 2014, 11 pgs.
"How to Write Advertisements that Sell", How to Write Advertisements that Sell, author unknown, from System, the magazine of Business,, [Online]. Retrieved from the Internet: <http://library.duke.edu/digitalcollections/eaa_Q0050/>, (Feb. 21, 2015).
U.S. Appl. No. 11/732,694, Final Office Action mailed Jun. 25, 2015, 45 pgs.
U.S. Appl. No. 11/891,435, Final Office Action mailed Aug. 4, 2015, 47 pgs.
U.S. Appl. No. 11/891,435, Resonse filed Nov. 4, 2015 to Final Office Action mailed Aug. 4, 2015, 14 pgs.
U.S. Appl. No. 11/891,435, Response filed Jun. 23, 2015 to Non Final Office Action mailed Mar. 4, 2015, 31 pgs.
U.S. Appl. No. 11/891,437, Final Office Action mailed Jun. 24, 2015, 40 pgs.
U.S. Appl. No. 11/891,437, Response filed Sep. 30, 3015 to Final Office Action mailed Jun. 24, 2015, 13 pgs.
U.S. Appl. No. 12/693,433, Examiner Interview Summary mailed Jul. 7, 2015, 4 pgs.
U.S. Appl. No. 12/693,433, Response filed Jul. 7, 2015 to Non Final Office Action mailed Apr. 7, 2015, 31 pgs.
U.S. Appl. No. 12/907,183, Examiner Interview Summary mailed Oct. 8, 2015, 3 pgs.
U.S. Appl. No. 12/907,183, Final Office Action mailed Jun. 29, 2015, 25 pgs.
U.S. Appl. No. 12/907,183, Response filed Oct. 29, 2015 to Final Office Action mailed Jun. 29, 2015, 11 pgs.
U.S. Appl. No. 11/732,694, Examiner Interview Summary mailed Jul. 11, 2016, 4 pgs.
U.S. Appl. No. 11/732,694, Non Final Office Action mailed Jun. 8, 2016, 46 pgs.
U.S. Appl. No. 11/732,694, Response filed Nov. 25, 2015 to Final Office Action mailed Jun. 25, 2015, 15 pgs.
U.S. Appl. No. 11/891,435, Non Final Office Action mailed Apr. 7, 2016, 49 pgs.
U.S. Appl. No. 11/891,437, Non Final Office Action mailed Apr. 5, 2016, 41 pgs.
U.S. Appl. No. 12/693,433, Final Office Action mailed Nov. 24, 2015, 39 pgs.
U.S. Appl. No. 12/907,183, Notice of Allowance mailed Dec. 18, 2015, 9 pgs.
"How to Write Advertisements that Sell", A. W. Shaw Co.,from System , the magazine of Business, (1912).

\* cited by examiner

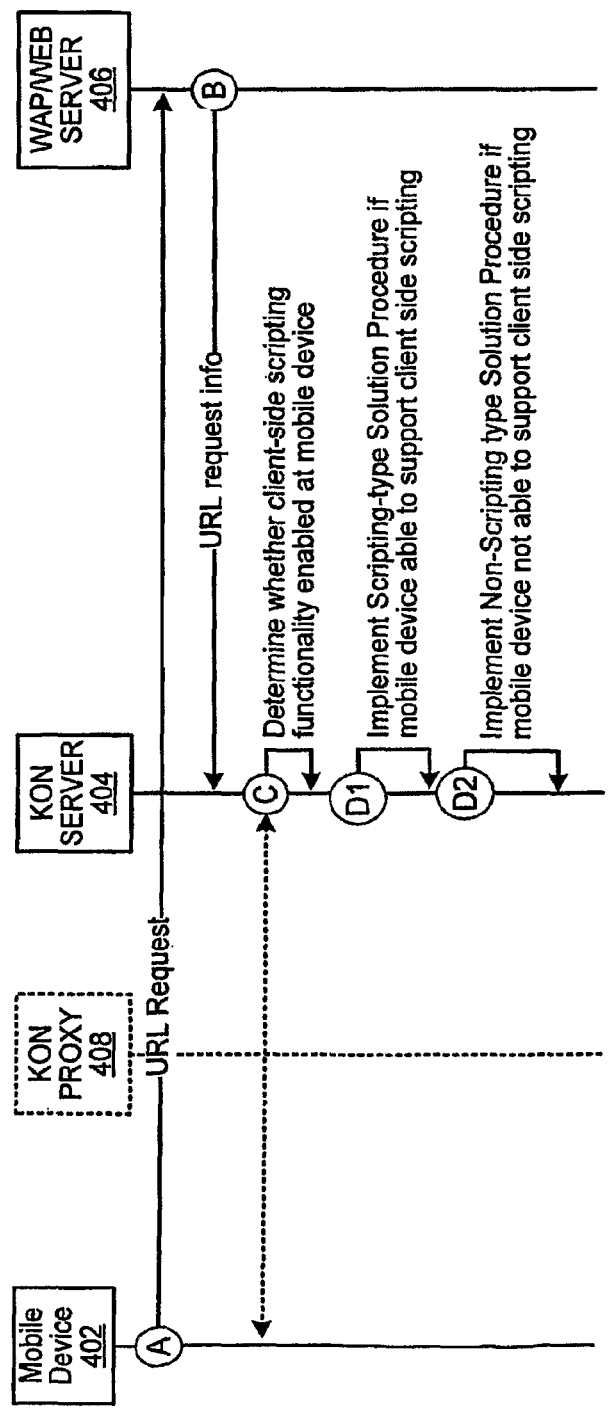

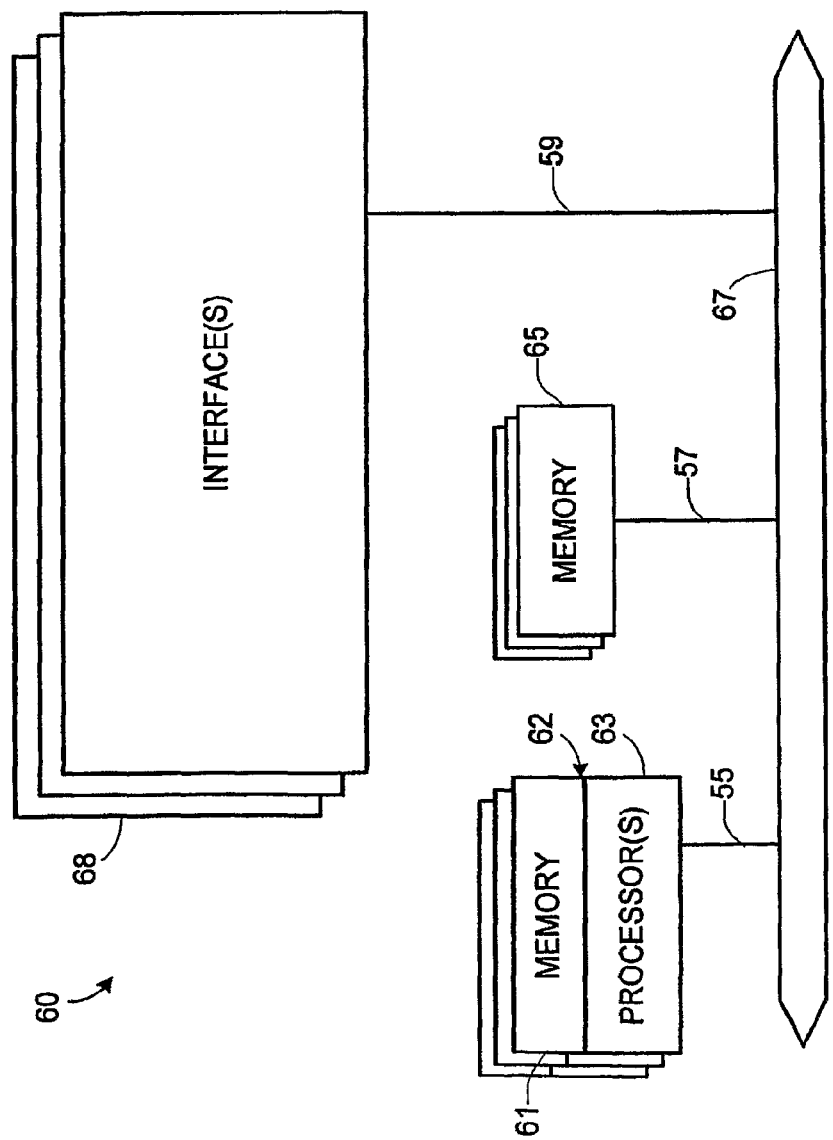

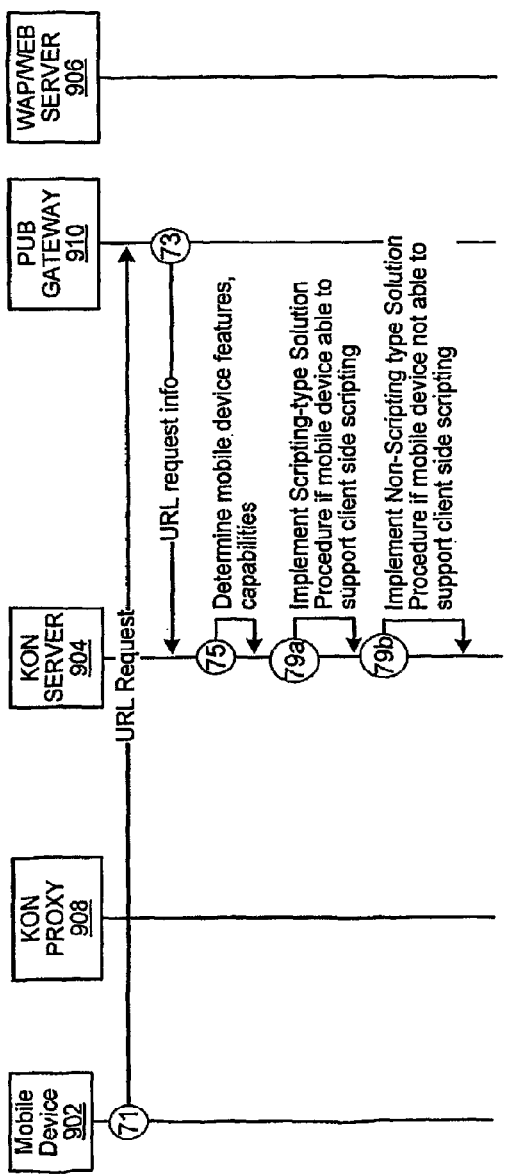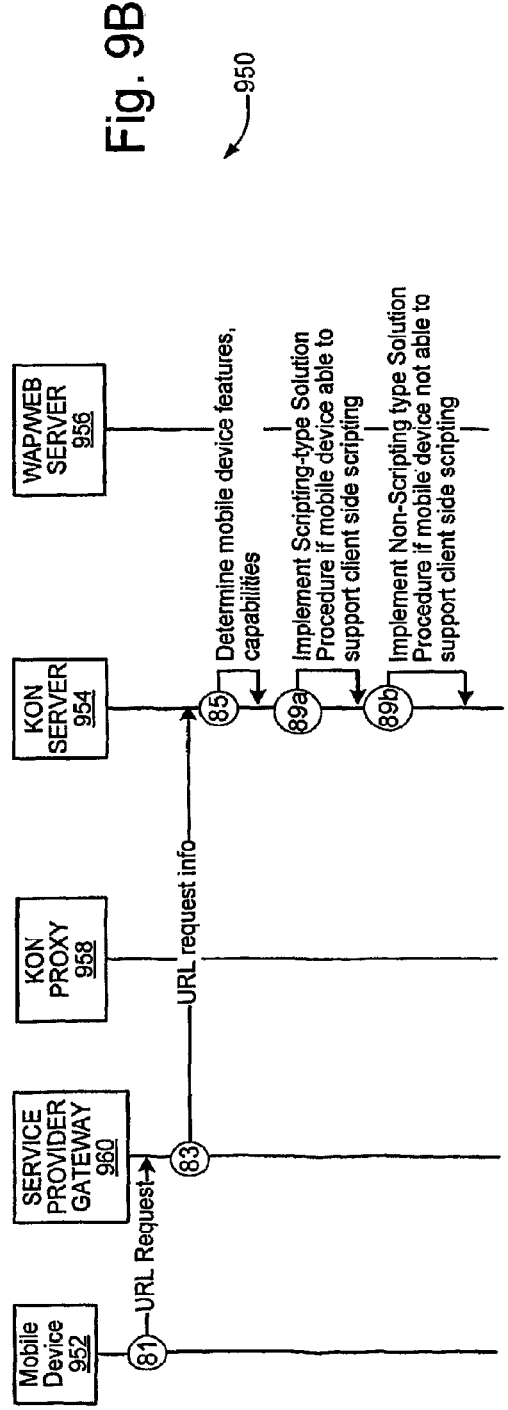

CONTEXTUAL ADVERTISING TECHNIQUES FOR IMPLEMENTED AT MOBILE DEVICES

CROSS-REFERENCE TO RELATED APPLICATIONS

This application claims the benefit of International Application No. PCT/US2007/008042 filed on Apr. 2, 2007, which claims priority of U.S. Provisional Patent Application No. 60/789,118, filed on Apr. 3, 2006, each of which is hereby incorporated by reference in its entirety for all purposes.

BACKGROUND OF THE INVENTION

Over the past decade the Internet has rapidly become an important source of information for individuals and businesses. The popularity of the Internet as an information source is due, in part, to the vast amount of available information that can be downloaded by almost anyone having access to a computer and a modem. Moreover, the internet is especially conducive to conduct electronic commerce, and has already proven to provide substantial benefits to both businesses and consumers.

Many web services have been developed through which vendors can advertise and sell products directly to potential clients who access their websites. To attract potential consumers to their websites, however, like any other business, requires target advertising. One of the most common and conventional advertising techniques applied on the Internet is to provide advertising promotions (e.g., banner ads, pop-ups, ad links) on the web page of another website which directs the end user to the advertiser's site when the advertising promotion is selected by the end user. Typically, the advertiser selects websites which provide context or services related to the advertiser's business.

Conventionally, the process of adding contextual advertising promotions to web page content is both resource intensive and time intensive. In recent years the process has been somewhat automated by utilizing software applications such as application servers, ad servers, code editors, etc. Despite such advances, however, the fact remains that conventional contextual advertising techniques typically require substantial investments in qualified personnel, software applications, hardware, and time.

Furthermore, conventional on-line marketing and advertising techniques are often limited in their ability to provide contextually relevant material for different types of web pages.

As access to the Internet becomes more available, there is a greater potential to present contextually relevant advertisements to different markets of people who are able to access the Internet via different types of devices.

SUMMARY

Various aspects of the present invention are directed to different methods, systems, and computer program products for delivering contextual advertising information to end users of a data network via a mobile device. A first portion of content relating to a first page intended for display on the first mobile device is received. In one embodiment, the first page may correspond to a first URL associated with a first content provider. The first portion of content is analyzed for keyword information. A first portion of keyword information associated with the first portion of content is identified. In one embodiment, the first portion of keyword information includes at least one keyword. A first portion of contextual information to be delivered to the first mobile device is selected using the first portion of keyword information. In one embodiment, the first portion of contextual information may be provided by a first campaign provider. A first set of web page modification instructions may be generated using the first portion of contextual information. In one embodiment, the first set of web page modification instructions includes instructions for modifying the content to include the first portion of contextual information. The first set of web page modification instructions may be provided to the first mobile device to thereby cause the first portion of contextual information to be delivered to the user.

Other aspects of the present invention are directed to different methods, systems, and computer program products for delivering contextual advertising information to end users of a data network via a mobile device. In at least one embodiment, mobile device capability information relating to an identified mobile device may be acquired. In one embodiment, the mobile device capability information may include information relating to one or more features which are supported at the identified mobile device. At least one operation may be initiated to determine whether a first feature is supported at the identified mobile device. A first contextual advertising delivery technique may be implemented in response to a determination that the first feature is supported at the identified mobile device. A second contextual advertising delivery technique may be implemented in response to a determination that the first feature is not supported at the identified mobile device.

Other aspects of the present invention are directed to different methods, systems, and computer program products for delivering contextual advertising information to end users of a data network via a mobile device. At least one operation may be initiated to determine whether client side scripting functionality is supported at an identified mobile device. A first contextual advertising delivery technique may be implemented in response to a determination that client side scripting functionality is supported at the identified mobile device. In one embodiment, the first contextual advertising delivery technique includes providing scripting instructions to the identified mobile device for causing the identified mobile device to automatically perform one or more desired operations. A second contextual advertising delivery technique may be implemented in response to a determination that client side scripting functionality is not supported at the identified mobile device. In one embodiment, the second contextual advertising delivery technique is implemented without reliance on use of client side scripting operations implemented at the identified mobile device.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 4B shows a flow diagram of an alternate embodiment of a non-scripting solution procedure.

FIG. 7 shows a specific embodiment of a network device 60 suitable for implementing at least a portion of the contextual information delivery techniques described herein.

FIGS. 9B and 9B illustrate different data flow diagrams which may be utilized in different embodiments.

DETAILED DESCRIPTION OF EXAMPLE EMBODIMENTS

Figure 1:
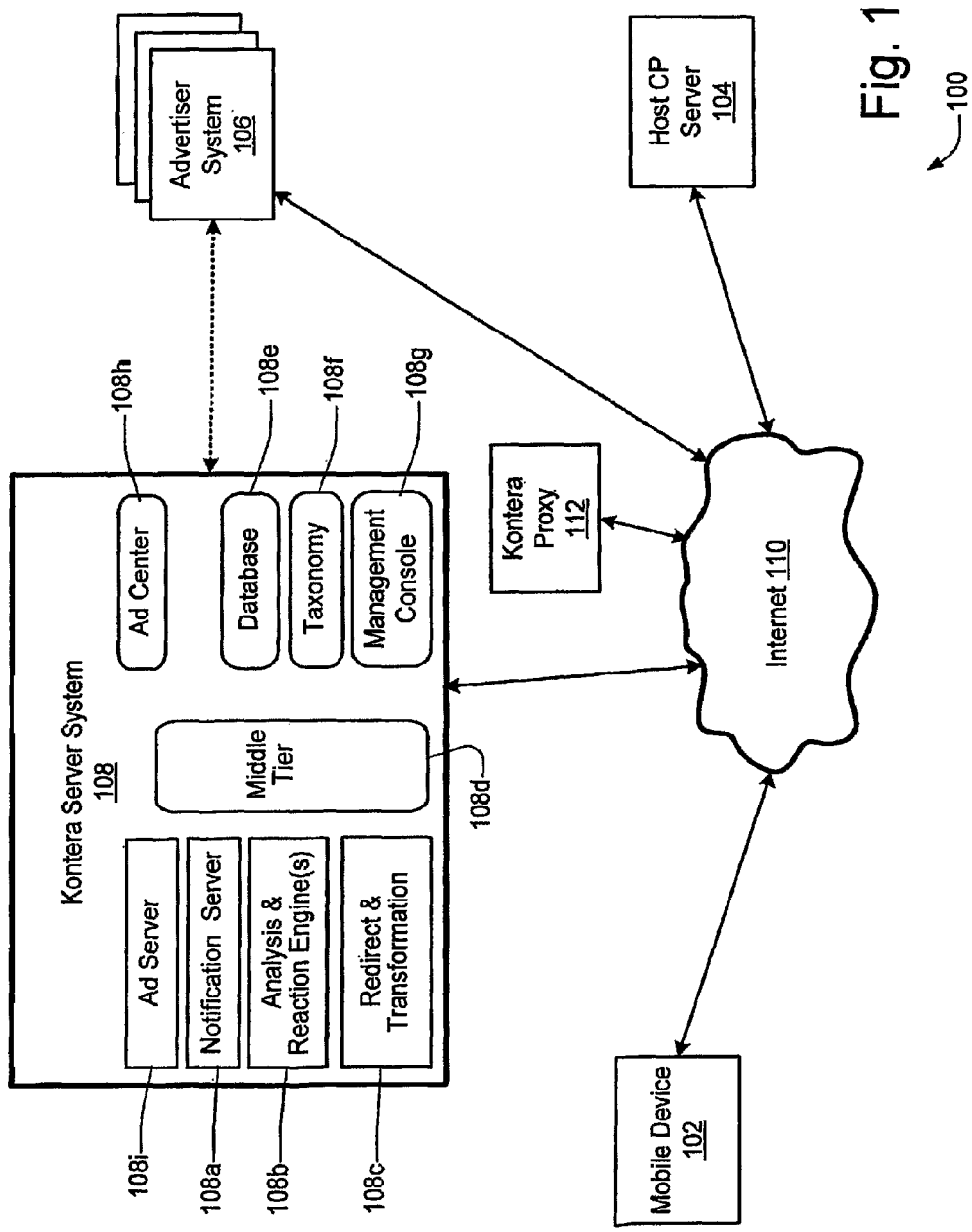
FIG. 1 shows a block diagram of a computer network portion 100 which may be used for implementing various aspects of the present invention in accordance with a specific embodiment.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

The present invention relates to a technique for real-time web and/or WAP (Wireless Access Protocol) page context analysis and real-time insertion of textual markup objects and dynamic content. According to a specific embodiment, the technique of the present invention may be used for enabling advertisers to provide contextual advertising promotions to end-users based upon real-time analysis of web page content that is being served to the end-user's computer system or mobile device, such as a mobile phone, cell phone, personal organizer, hand-held computer, etc. In at least one embodiment, the information obtained from the real-time analysis may be used to select, in real-time, contextually relevant information, advertisements, and/or other content which may then be displayed to the end-user, for example, via real-time insertion of textual markup objects and/or dynamic content.

According to different embodiments of the present invention, a variety of different techniques may be used for displaying the textual markup information and/or dynamic content information to the end-user. Such techniques may include, for example, placing additional links to information (e.g., content, marketing opportunities, promotions, graphics, commerce opportunities, etc.) within the existing text of the web page content by transforming existing text into hyperlinks; placing additional relevant search listings or search ads next to the relevant web page content; placing relevant marketing opportunities, promotions, graphics, commerce opportunities, etc. next to the web page content; placing relevant content, marketing opportunities, promotions, graphics, commerce opportunities, etc. on top or under the current page; finding pages that relate to each other (e.g., by relevant topic or theme), then finding relevant keywords on those pages, and then transforming those relevant keywords into hyperlinks that link between the related pages; etc.

One aspect of the present invention relates to a technique for implementing contextual in-text keyword advertising techniques in mobile devices.

The following disclosure describes various embodiments for implementing contextual in-text keyword advertising techniques for mobile devices such as, for example, mobile phones, PDAs, smart phones, and/or any other mobile devices that have Internet connectivity abilities.

FIG. 1 shows a block diagram of a computer network portion 100 which may be used for implementing various aspects of the present invention in accordance with a specific embodiment. As illustrated in FIG. 1, network portion 100 may include various devices and/or systems such as, for example, at least one mobile device 102, at least one host server or content provider (CP) server 104 (which, for example, may host or provide content for an Internet website and/or a wireless access protocol (WAP) website, at least one advertiser system/information provider 106, and at least one contextual analysis and response server (herein referred to as "Kontera Server System" or "Kontera Server") 108. Additionally, in at least some implementations, network portion 100 may also include a Kontera Proxy system 112, which, for example, may be operable to function as an Internet-based proxy server.

It at least one embodiment, the Kontera Server System 108 may be configured or designed to implement various aspects of the present invention including, for example, real-time web page context analysis and/or real-time insertion of textual markup objects and dynamic content. In the example of FIG. 1, the Kontera Server System 108 is shown to include one or more of the following components: an Ad Server module 108i, a Notification Server 108a, Analysis & Reaction Engine(s) 108b, a Redirect & Transformation Engine 108c, a Middle Tier component 108d, a database 108e, a Taxonomy component 108f, a Management Console 108g, an Ad Center component 108h, etc. It will be appreciated that other embodiments may include fewer, different and/or additional components than those illustrated in FIG. 1. A number of these components are described in greater detail with respect to FIG. 2 of the drawings.

Figure 2:
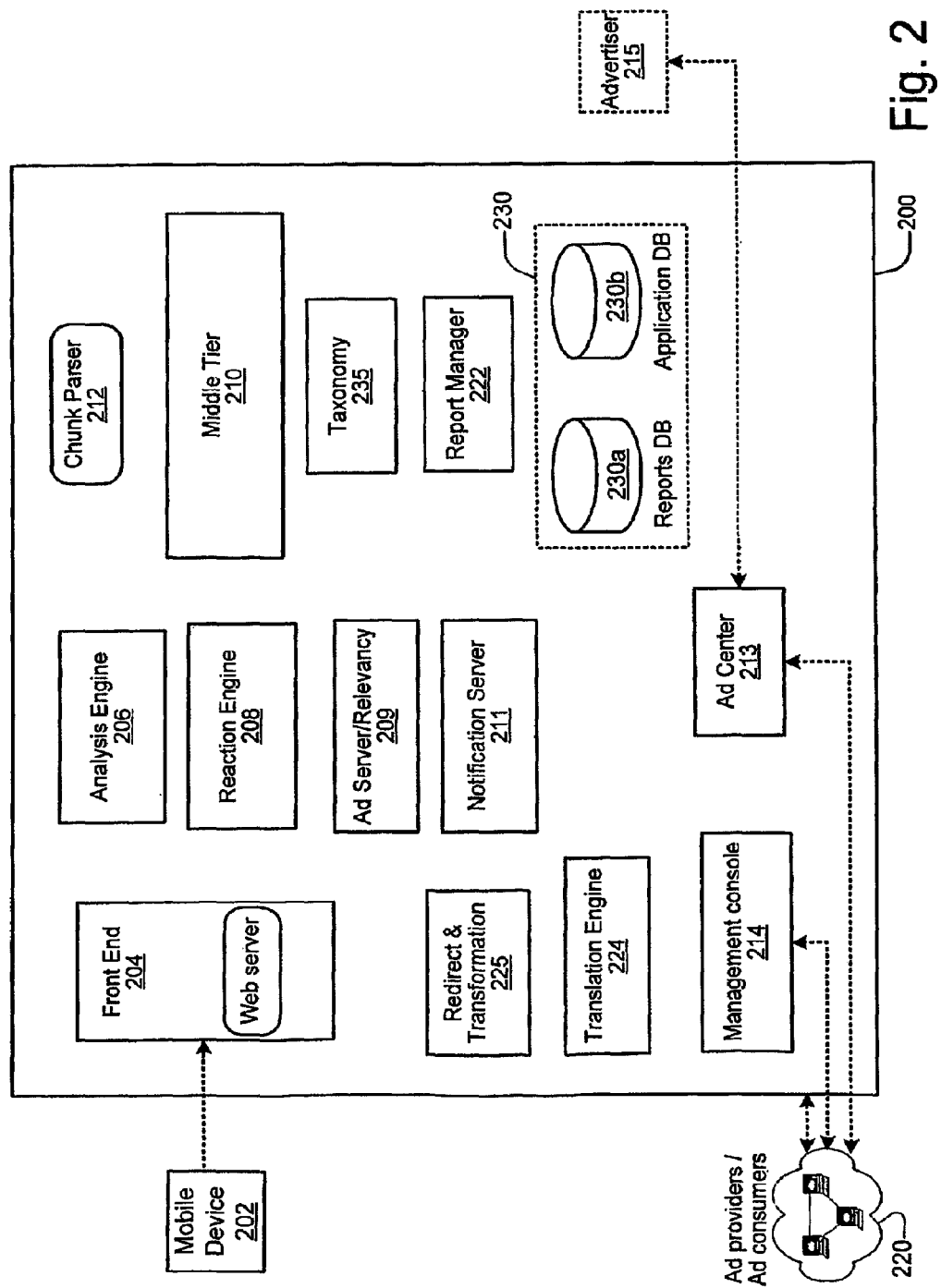
FIG. 2 shows a block diagram of various components and systems of the Kontera Server System 200 which may be used for implementing various aspects of the present invention in accordance with a specific embodiment.

FIG. 2 shows a block diagram of various components and systems of a Kontera Server System 200 which may be used for implementing various aspects of the present invention in accordance with a specific embodiment. As illustrated in the embodiment of FIG. 2, the Front End component 204 may include, for example, at least one web server, and may configured or designed to handle requests from one or more client systems and/or mobile devices (e.g., 202).

The Analysis Engine 206 may be operable to perform real-time analysis of web page content. As illustrated in the example of FIG. 2, the Analysis Engine 206 may include various functionality, including, for example, but not limited to, one or more of the following: functionality for identifying keywords on selected web pages; functionality for combining or linking keywords into groups or concepts; functionality for identifying topics of a web page based on the identified keywords; functionality for identifying aliases for topics associated with selected web pages; functionality for determining various attributes of one or more mobile devices such as, for example: user location, device type, language, market, wireless service plan details, available functionality and/or capabilities, etc.

The Reaction Engine 208 may be operable to utilize information provided by the Analysis Engine 206 to generate real-time web page modification instructions to be implemented by the mobile device when rendering web page information. According to a specific embodiment, the web page modification instructions may include instructions relating to the insertion of textual markup objects and/or dynamic content for selected web pages being displayed on the mobile device. As illustrated in the example of FIG. 2, the Reaction Engine 208 may include various functionality, including, for example, but not limited to, one or more of the following: functionality for identifying links between web pages of the same web site and/or between web pages from different web sites; functionality for filtering advertisements based upon predetermined criteria (such as, for example, publisher preferences); functionality for storing information relating to previous analysis of web pages; functionality for selecting or determining recommended web page modification instructions based upon selected user profile information (e.g., user click behavior, Geolocation, etc.); etc.

The Ad Server/Relevancy module 209 may be operable to manage and/or provide access to advertising information and/or related keyword information. For example, In at least one embodiment, Ad providers 220 (e.g., Yahoo, Looksmart, Ask.com, etc.), advertisers, and/or ad campaign providers/managers may provide to the Ad Server/Relevancy module 209 one or more advertisements (ads) relating to one or more different keywords. The Ad Server/Relevancy module 209 may be operable to determine and/or store a respective relevancy score for each ad. Addinally, the Ad Server/Relevancy module 209 may be operable to determine and/or store other ad related information such as, for example: related page topic information, cost-per-click (CPC) information, etc. The Ad Server/Relevancy component 209 may also be operable to be queried by one or more other components/systems such as, for example, Reaction Engine 208. For example, in one embodiment, the Reaction Engine may query the Ad Server/Relevancy module for information relating to a particular ad or keyword, and the Ad Server/Relevancy module may respond by providing relevant information which, for example, may be used by the Reaction Engine to facilitate the selection of one or more keyword/ad candidates.

The Redirect & Transformation Engine 225 may be operable to include redirect, translation and/or tracking functionality. For example, in at least one embodiment, the Redirect & Transformation Engine 224 may include various functionality, including, for example, but not limited to, one or more of the following: functionality for redirecting clients to a specified destination; functionality for analyzing and translating data relating to user activity into desired user behavior information; functionality for tracking and storing information relating to user behaviors, clicks and/or impressions; etc.

Management console 214 may be operable to provide a user interface for creating and viewing reports, setting system configurations and parameters. According to a specific embodiment, the management console 214 may be configured or designed to allow content providers and/or advertisers to access the Kontera Server System in order to, for example: access desired information stored at the Kontera Server System (e.g., keyword taxonomy information, content provider information, advertiser information, etc.); manage and generate desired reports; manage information relating to one or more ad campaigns; etc.

Notification Server 211 operable to manage ad update information and/or related activities or events. In at least one embodiment, the Notification Server 211 may be operable to manage ad update activities, events, and/or related information in real-time.

Other components of the Kontera Server System 200 may include, but are not limited to, one or more of the following (or combinations thereof): a chunk parser 212 (such as, for example, a part-of-speech text processor) operable to parse chunks of received web page content and/or to perform analyses of the text syntax; a Middle Tier component 210 configured or designed to include data warehouse and business logic functionality; at least one database 230 for storing information such as, for example, web page analysis information, application data, reports, taxonomy information, ontology information, etc.; a report manager 222 for collecting and storing reports and other information from different components in the Kontera Server System; a Translation Engine 224 for translating or converting communications from one format type to another format type (e.g., from XML to HTML or vice versa); a parsing engine for parsing HTML into readable text; an Ad Center component 213 operable to provide a user interface to one or more advertisers or ad campaign managers (e.g., 215) for performing various operations such as, for example, setting up ad campaigns, managing ad campaigns, generating reports; a Taxonomy component 235 operable to manage, store and/or provide access to taxonomy information (which, for example, may include keyword related information and/or topic related information); etc.

It will be appreciated that alternate embodiments of the Kontera Server System of the present invention may include additional or fewer components than those illustrated in FIG. 2, and/or may be adapted to include different types of functionality.

It will be appreciated that there are a number of differences between consumer mobile devices (such as mobile phones, PDA, smart phones, etc.) and consumer computer systems (such as, for example, desktop or notebook computers) which, for example, make it difficult for conventional online advertising techniques to be implemented on conventional consumer mobile devices. For example, one issue which makes it difficult to implement conventional online advertising techniques on conventional mobile devices relates to the fact that there are many different types of mobile devices supporting different features, services, and/or capabilities which are available to both consumers and businesses. For example, some mobile devices may have only support text messaging and not web browsing. Other mobile devices may support only limited web browsing functionality, and may not support scripting functionality. Yet other mobile devices may support web browsing and scripting, but may not support advanced HTML features such as, for example, pop-up layer and/or mouse-over tool-tip layer functionality. Such functional differences among the various different mobile devices make it difficult to implement contextual advertising techniques which are able to be supported across all of the different mobile device platforms.

In order to overcome such difficulties, at least one aspect of the present invention is directed to different techniques for automatically determining the available features, services, and/or capabilities which are supported on one or more identified mobile devices. According to specific embodiments, different embodiments of the contextual advertising techniques of the present invention may be utilized on different mobile devices, depending on the specific features, services, and/or capabilities supported on each mobile device.

For example, in at least one embodiment, one or more techniques may be implemented to determine whether an identified mobile device supports client side scripting (e.g., JavaScript). In one embodiment, a mobile device which supports scripting functionality may allow a contextual advertising technique to be implemented which, for example, utilizes a scripting mechanism that executes on the mobile device's browser in order to communicate with the Kontera Server System. According to specific embodiments, the scripting mechanism may be operable to implement a variety of operations such as, for example: passing relevant content to the Kontera Server System for analysis; receiving markup instructions from the Kontera Server System or Kontera Proxy; receiving modified content which includes marked up text (e.g., ContentLinks); performing markup operations on content (e.g., text) to be displayed on the mobile device display; etc.

In at least one embodiment, if it is determined that an identified mobile device does not support client side scripting (e.g., executing client side code such as JavaScript on the device's browser), one or more non-scripting based contextual advertising techniques may be implemented in order to deliver contextual advertising content to the mobile device user. For example, in at least one embodiment, a proxy mechanism may be used to analyze selected content and/or to markup specific keywords) within the selected content. In one embodiment, content from a requested web page or wireless access protocol (WAP) page may be served to the mobile device via a proxy server, such as, for example, the Kontera Proxy 112. In at least one embodiment, the Kontera Proxy may be operable to analyze selected content, determine relevant keywords, and perform markup operations on specific keyword(s) in the content to thereby generate modified content containing one or more ContentLinks which may be provided to the mobile device for display on the mobile device display. In other embodiments, the Kontera Proxy may be operable to forward selected content to the Kontera Server System for contextual advertising analysis and markup. The Kontera Server System may be operable to analyze selected content, determine relevant keywords, and perform markup operations on specific keyword(s) in the content to thereby generate modified content containing one or more ContentLinks. The modified content may then be passed to the Kontera Proxy, which may forward the modified content to the mobile device for display on the mobile device display.

In at least one embodiment, one or more techniques may be implemented to determine whether an identified mobile device supports various display features such as, for example, advance HTML features, rich media features (e.g., Flash plugin), video, etc. For example, in one embodiment, one or more techniques may be implemented to determine whether an identified mobile device supports functionality for displaying mouse-over tool tip layers. Such functionality allows advertising information to be presented to the user without requiring the user to perform a mouse click operation. For example, in one embodiment, when the user hovers his or her display pointer over a selected ContentLink (e.g., marked up keyword(s)), advertising information may be displayed within a tool tip layer on the existing page. In one embodiment, if the user clicks on the ContentLink or clicks on the tool-tip layer ad, the user may be redirected to the advertiser's page.

For purposes of illustration, the contextual advertising and markup techniques disclosed herein will be described with respect to the use of ContentLinks. However, other embodiments of the present invention may utilize other types of advertising techniques which, for example, may be used for modifying displayed content (and/or for generating modified content) in order to present desired contextual advertising information on a mobile device display. Examples of at least some advertising techniques which may be utilized in one or more embodiments of the present invention are described, for example, in FIGS. 8A-B of the drawings.

Figure 8A:
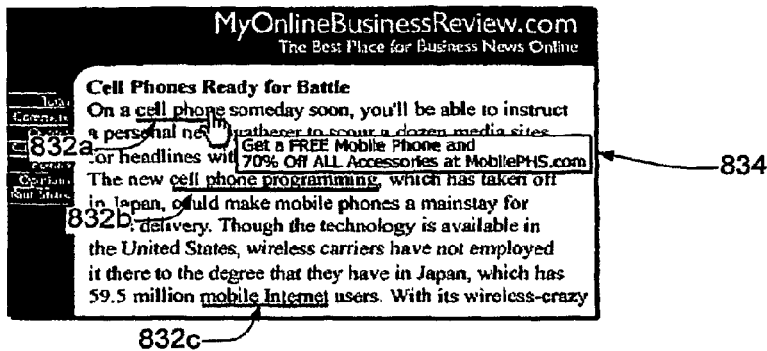
FIGS. 8A and 8B provide examples of various screen shots which illustrate different techniques which may be used for modifying web page displays in order to present additional contextual advertising information.
Figure 8B:
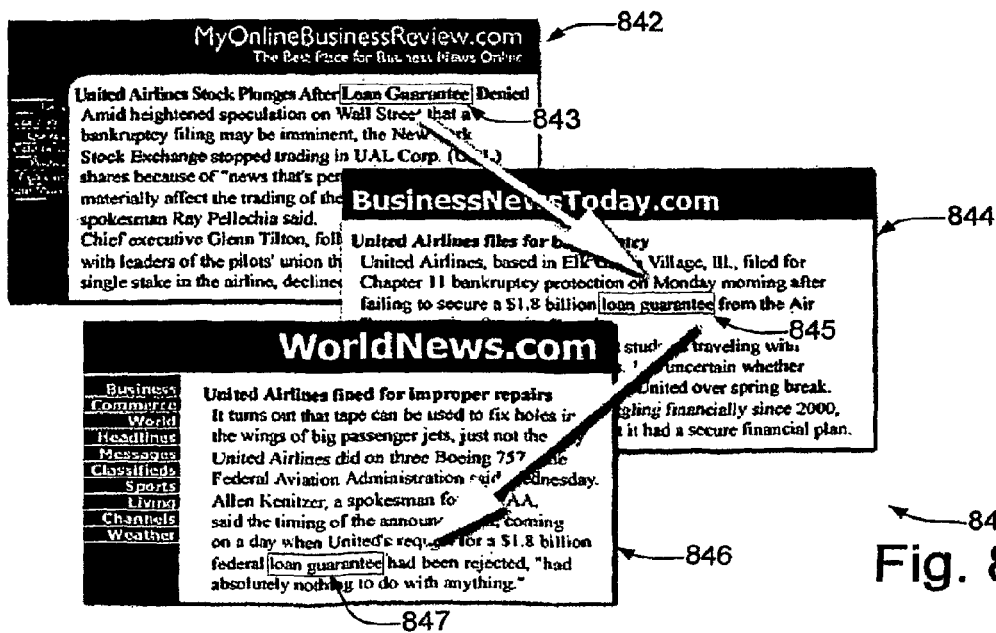

FIGS. 8A-B provide examples of various screen shots which illustrate different techniques which may be used for modifying web page displays in order to present additional contextual advertising information. FIG. 8A illustrates a technique (herein referred to as "ContentLinks") for placing additional links (832a, 832b) to information (834) (e.g., content, marketing opportunities, promotions, graphics, commerce opportunities, etc.) within the existing text of the web page content by transforming (e.g., marking up) existing text (832a, 832b) into hyperlinks. In one embodiment, the additional information (e.g., 834) may be automatically displayed to the user via a tool-tip layer which may be activated or displayed when the user performs a "mouse over" action on (e.g., hovers the display pointer over) text (e.g., 832a) which has been marked up using one or more of the techniques described herein. In another embodiment, the user may be required to click on the marked up text or hyperlink (e.g., 832a) in order to cause the additional information (e.g., 834) to be displayed. FIG. 8B illustrates a technique (herein referred to as "Related Content Links") for finding web pages (842, 844, 846) that relate to each other (e.g., by relevant topic or theme), finding relevant keywords (843, 845, 847) on those pages, and then transforming those relevant keywords into hyperlinks that link between the related pages.

Figure 3A:
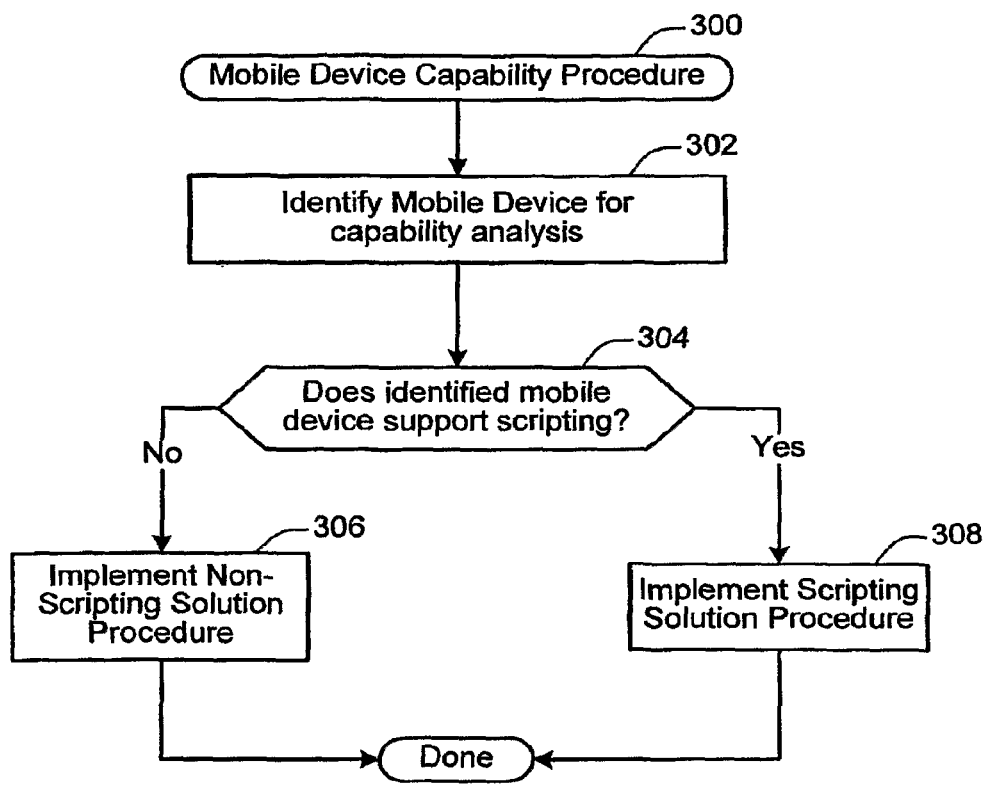
FIGS. 3A and 3B illustrate various embodiments of different mobile device capability procedures which may be used for implementing various aspects of the present invention.

FIG. 3A shows a specific embodiment of a Mobile Device Capability Procedure 300 which may be used for implementing various aspects of the present invention. In at least one implementation, at least a portion of the Mobile Device Capability Procedure 300 may be implemented at the Kontera Server System (e.g., 108) and/or Kontera Proxy (e.g., 112). In at least some embodiments, portions of the Mobile Device Capability Procedure 300 may be implemented on one or more servers associated with one or more mobile telephone carriers or service providers.

As shown at 302, a specific mobile device (e.g., 102) may be identified for capability analysis. In one implementation, this may be accomplished by examining information in the header portion(s) of communication messages sent from mobile device. Such information, which, for example, may be sent as part of a request to a server, provides information about both the mobile device and/or the device's browser's supported features, services and/or capabilities. Other techniques for determining the identity of a given mobile device (and/or associated browser application) may be implemented using other types of information associated with the mobile device (and/or it's user) such as, for example: mobile device serial number, IP address, MAC address, associated phone number, WAP address, IMEI Operator Info (e.g., real time/stored), $3^{rd}$ party data (such as, for example, location based service provider information; service provider information; content provider information; etc.), user information, User Agent (UA) information, UA Prof, enabled wireless communication protocols, etc.

At 304 it may be determined whether the identified mobile device supports scripting functionality. For example, in one embodiment, it may be determined whether the identified mobile device is able to execute client side code (such as, for example, JavaScript™) on the device's browser. According to a specific implementation, such a determination may be based, at least in part, upon on the browser and mobile device specifications.

For example, by examining the browser and/or mobile device specifications, one may determine the mobile device features, capabilities, etc. (such as, for example, scripting, advance HTML features, rich media features, video, etc.). Other techniques for identifying features/capabilities of the mobile device (and/or associated browser application) may include, but are not limited to, one or more of the following (or combinations thereof):

identifying the model number or serial number of the mobile device, and performing a database query (at one or more databases) to determine the capabilities, services, and/or features supported by mobile devices matching that model number or serial number;

determining an identity of the mobile device (e.g., by serial number, IP address, MAC address, phone number, etc.), and maintaining a device profile which identifies the capabilities, services, and/or features supported by that particular mobile device;

utilizing other types of information such as, for example: IMEI Operator information; location based service provider information; service provider information; content provider information; user information; User Agent (UA) information; enabled wireless communication protocol information; etc.

In at least one embodiment, the Kontera Proxy and/or Kontera Server System may include a Device Capabilities database which is operable for storing mobile device capability information relating to a plurality of different mobile devices. Such mobile device capability information may include information relating to various features, services, and/or capabilities which are supported and/or enabled at different mobile devices, such as, for example, whether a given mobile device is configured to support client side scripting; whether the mobile device is configured to support advanced display features such as, for example, advance HTML features (such as, for example, functionality for displaying mouse-over tool tip layers within the mobile device's browser application), rich media features (e.g., Flash plugin), video, etc. For example, in one embodiment, at least one database may be used for storing and providing access to mobile device capability information relating to selected mobile phones, smart phones, and PDAs currently available for consumer purchase. In at least one embodiment, at least a portion of the accessible mobile device capability information may be provided and/or managed by manufacturers, distributors, and/or vendors of the various mobile devices. In one embodiment, mobile device capability information relating to a particular mobile device may be obtained by querying the Device Capabilities database, for example, using the model number, serial number, and/or other identifiers which may be used to identify the individual mobile device and/or the type/make/model of the mobile device.

Another technique which may be used to determine supported features/capabilities of the mobile device (and/or associated browser application) is via communication with the mobile device. For example, in one embodiment, the Kontera Proxy, Kontera Server System, and/or other entity may query the mobile device about its supported features, capabilities, services, etc. In other embodiments, one or more communications may be sent to the mobile device in order to test specific features, capabilities, and/or services which may be supported or enabled at the mobile device. For example, in one embodiment, in order to determine whether the mobile device supports client side scripting functionality, the Kontera Server System (or Kontera Proxy) may transmit to the mobile device a portion of content (e.g., HTML content) which includes scripting instructions (e.g., JavaScript) intended for execution at the mobile device. In one embodiment, the scripting instructions may include instructions for transmitting a reply message to the Kontera Server System (and/or other systems). Thus, for example, if the mobile device supports client side scripting functionality, execution of the scripting instructions will cause the mobile device to automatically transmit a reply message to the Kontera Server System. If the mobile device does not support client side scripting functionality, the scripting instructions will not be executed, and no reply message will be sent to the Kontera Server System. In at least one embodiment, if the Kontera Server System does not receive the expected reply message from the mobile device within a predetermined time period (e.g., relative to when the scripting instructions were sent to the mobile device), the Kontera Server System may determine that the mobile device is not currently capable of supporting client side scripting functionality. Alternatively, if the expected reply message from the mobile device is received at the Kontera Server System, the Kontera Server System may determine that the mobile device is currently capable of supporting client side scripting functionality.

As shown in the embodiment of FIG. 3A, if it is determined that the identified mobile device does not support scripting, a non-scripting solution procedure (such as that illustrated, for example, in FIG. 4A) may be implemented (306). If it is determined that the identified mobile device does support scripting, a scripting solution procedure (such as that illustrated, for example, in FIG. 5) may be implemented (308).

Figure 3B:
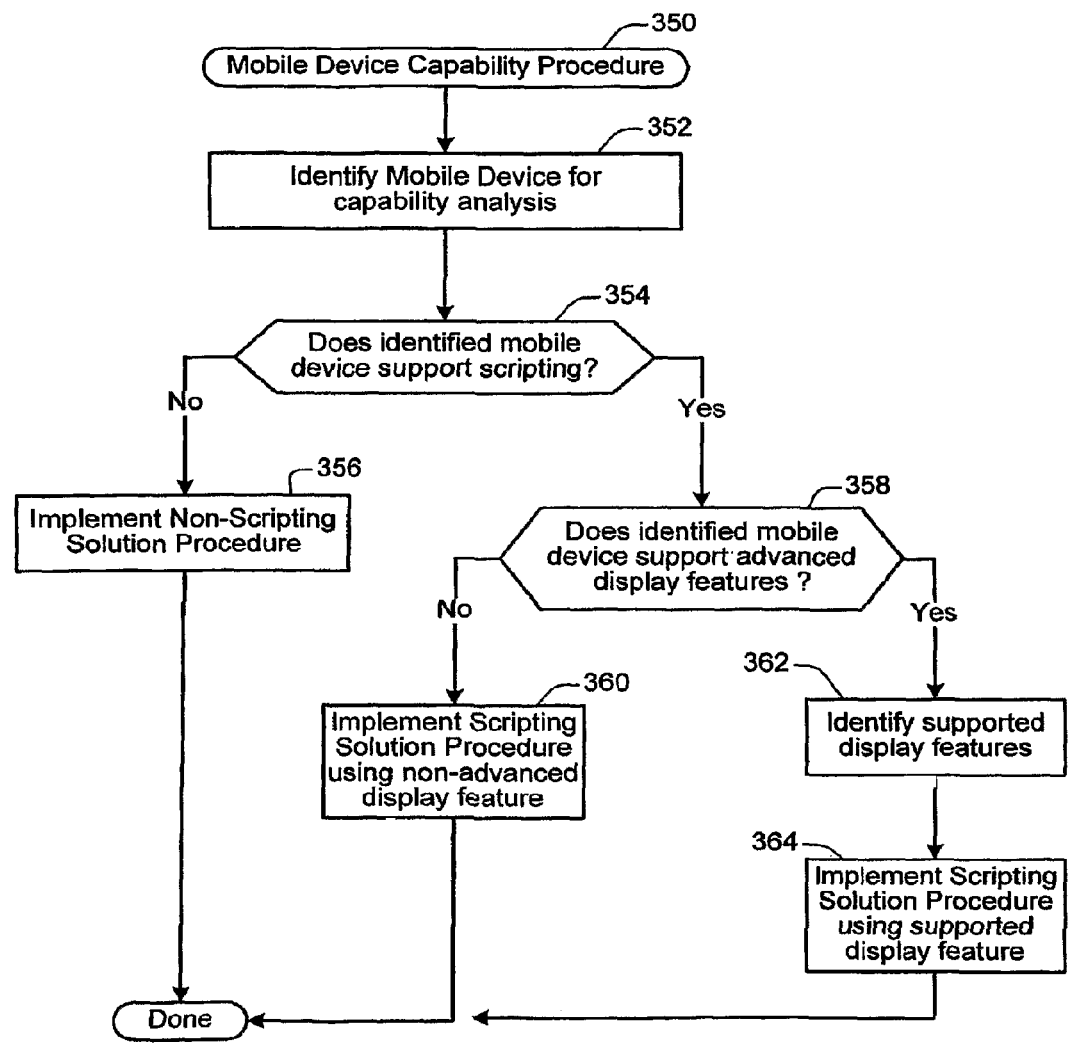

FIG. 3B shows a specific embodiment of a Mobile Device Capability Procedure 350 which may be used for implementing various aspects of the present invention. In at least one implementation, at least a portion of the Mobile Device Capability Procedure 350 may be implemented at the Kontera Server System (e.g., 108) and/or Kontera Proxy (e.g., 112). In at least some embodiments, portions of the Mobile Device Capability Procedure 350 may be implemented on one or more servers associated with one or more mobile telephone carriers or service providers.

As shown at 352, a specific mobile device (e.g., 102) may be identified for capability analysis. In one implementation, this may be accomplished by examining information in the header portion(s) of communication messages sent from mobile device.

At 354 it may be determined whether the identified mobile device supports scripting functionality. For example, in one embodiment, it may be determined whether the identified mobile device is able to execute client side code (such as, for example, JavaScript™) on the device's browser. According to a specific implementation, such a determination may be based, at least in part, upon on the browser and mobile device specifications.

As shown in the embodiment of FIG. 3B, if it is determined that the identified mobile device does not support scripting, a non-scripting solution procedure (such as that illustrated, for example, in FIG. 4A) may be implemented 356.

As shown at 358, at least one operation may be performed for determining whether the identified mobile device supports any advanced display features such as, for example, advance HTML features (such as, for example, functionality for displaying mouse-over tool tip layers within the mobile device's browser application), rich media features (e.g., Flash plugin), video, etc. If it is determined that the identified mobile device does support advanced display features, one or more of the advanced display features may be identified (362), and a scripting solution procedure (such as that illustrated, for example, in FIG. 5) may be implemented (364) using at least one contextual advertising markup technique which utilizes or takes advantage of one or more of the supported advanced display feature(s).

If it is determined that the identified mobile device does not support advance display features (but does support client side scripting), a scripting solution procedure (such as that illustrated, for example, in FIG. 5) may be implemented 360 using at least one contextual advertising markup technique which does not rely upon or require use of advanced display features.

Various aspects relating to contextual online advertising techniques are described in U.S. patent application Ser. No. 10/977,352, U.S. Publication No. US20050149395A1, naming HENKIN et al. as inventors, and filed Oct. 28, 2004, the entirety of which is incorporated herein by reference in its entirety for all purposes. At least some embodiments of the mobile device contextual advertising techniques described herein may be implemented using one or more techniques and/or mechanisms described in U.S. patent application Ser. No. 10/977,352.

Figure 4A:
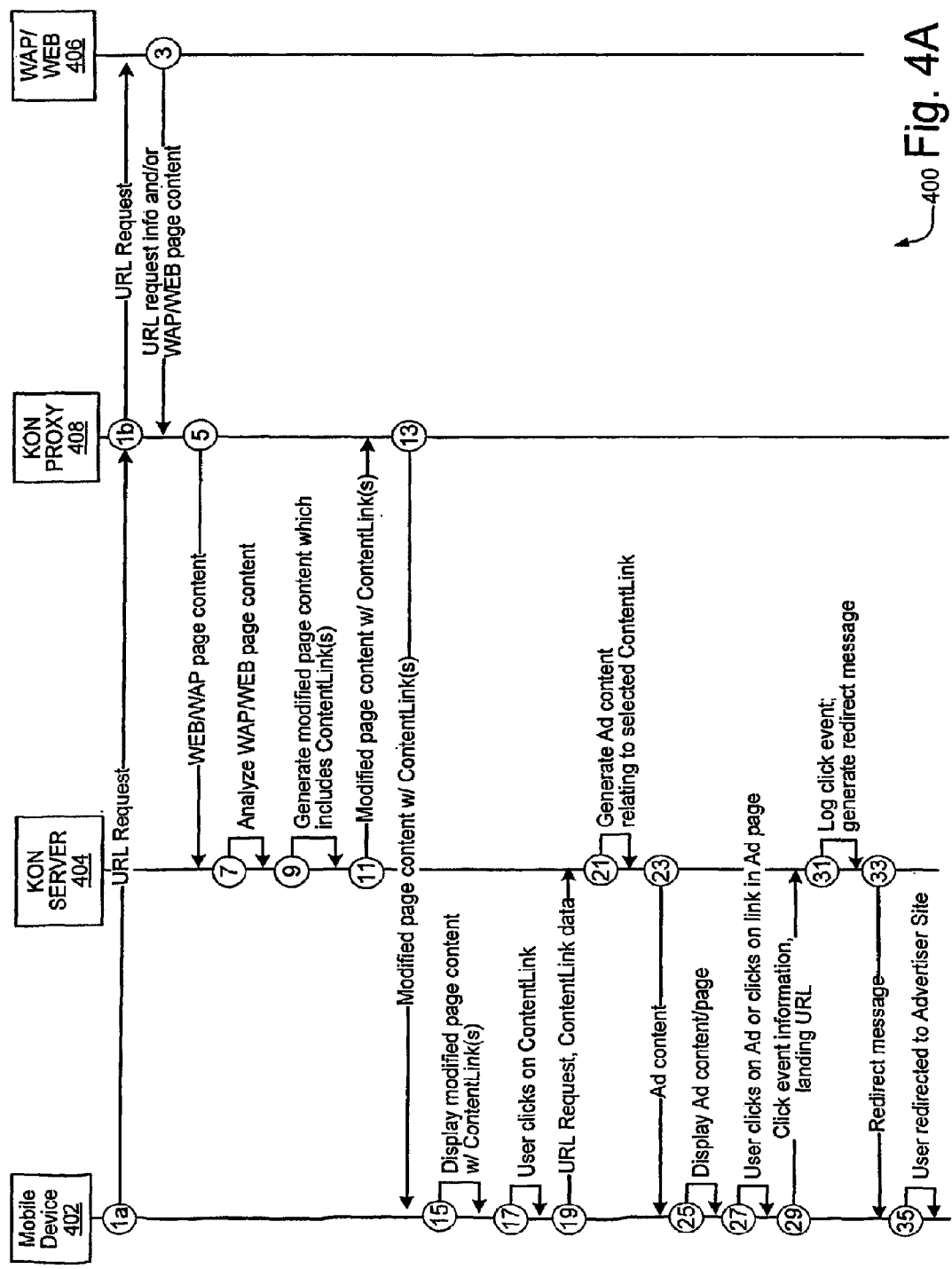
FIG. 4A shows flow diagram of a Non-Scripting Solution Procedure 400 illustrating various information flows and processes which may occur at various systems in accordance with a specific embodiment.

FIG. 4A shows flow diagram of a Non-Scripting Solution Procedure 400 illustrating various information flows and processes which may occur at various systems in accordance with a specific embodiment. In at least one embodiment, the Non-Scripting Solution Procedure 400 of FIG. 4A may be implemented in response to a determination that an identified mobile device is not able to support scripting (such as, for example, JavaScript™) on the device's browser.

In the example of FIG. 4A, it is assumed at (1a) that a user at the mobile device 402 has initiated a URL request to view a particular web page or WAP page (such as, for example, www.mobile.yahoo.com), which, for example, is being hosted at web server system and/or WAP server system (herein web/WAP server system) 406. Such a request may be initiated, for example, via the Internet using an Internet browser application running at the mobile device 402. As shown at (1b) of the embodiment of FIG. 4A, the URL request may be routed to WAP/WEB server 406 via the Kontera Proxy server 408 (and/or the Kontera Server System 404).

According to a specific embodiment, when the URL request is received at the WAP/WEB server system 406, server system 406 may respond by transmitting (3) the URL request info and/or web/WAP page content (corresponding to the requested URL) to a Kontera Proxy (KON PROXY) 408. According to specific embodiments, the service operator (e.g., which provides Internet connectivity for the mobile device) and/or WAP/WEB site publisher may redirect all or selected URL requests (e.g., URL requests originating from mobile phones and/or PDAs) to a Kontera Proxy for processing.

Figure 5:
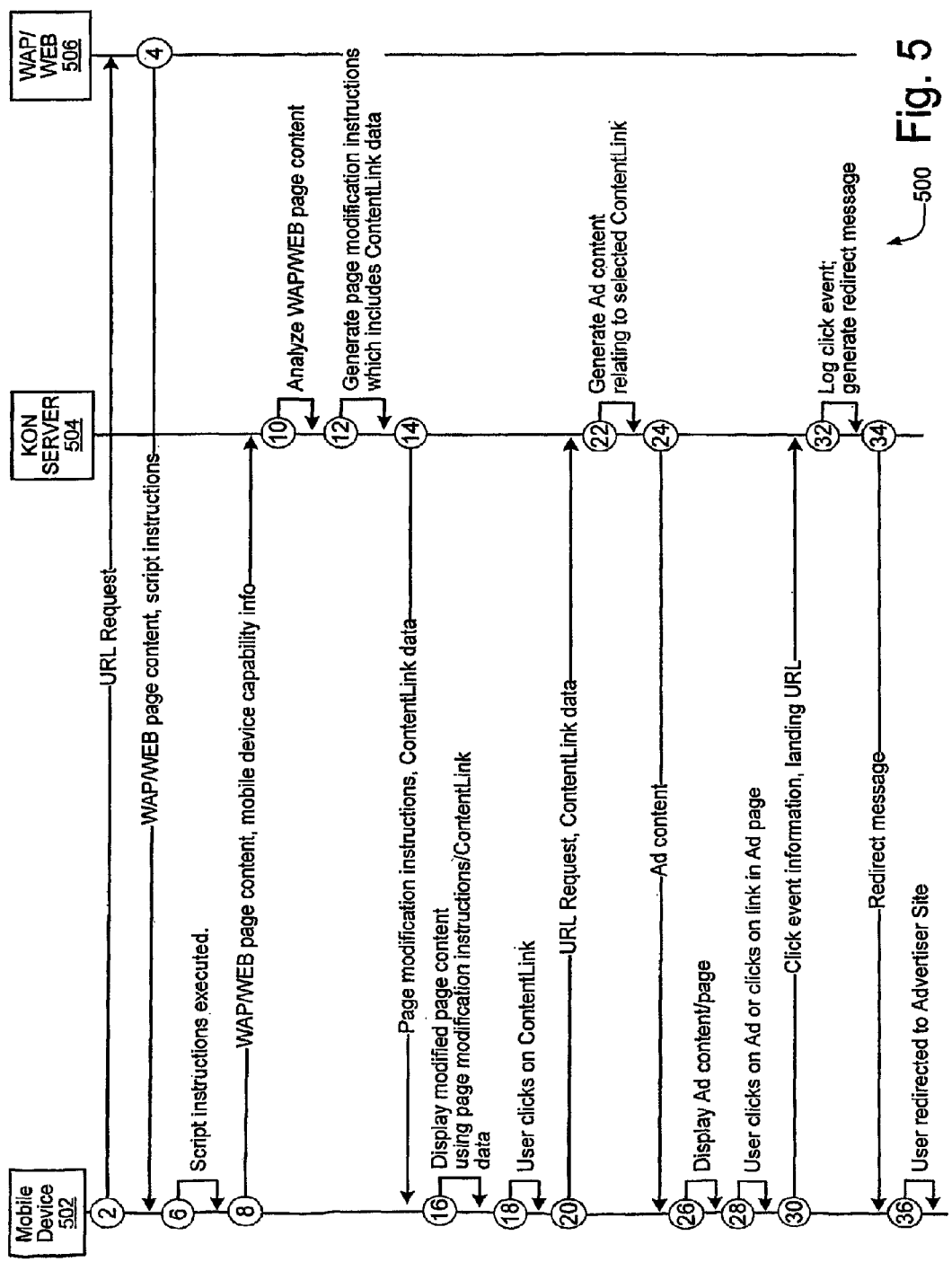
FIG. 5 shows flow diagram of a Scripting Solution Procedure 500 illustrating various information flows and processes which may occur at various systems in accordance with a specific embodiment.

In at least one embodiment, the Kontera Server System and/or Kontera Proxy may be operable to determine the mobile device capabilities in order to implement an appropriate procedure (e.g., as shown in FIGS. 4 and 5) to be used for displaying contextual advertising information at the mobile device. According to specific embodiments, this process may occur at different times such as for example: prior to the web/WAP page content being provided to the Operator Gateway; after the web/WAP page content has been provided to the Operator Gateway; prior to the web/

WAP page content being provided to the Kontera Proxy; after the web/WAP page content has been provided to the Kontera Proxy; prior to the web/WAP page content arriving at the mobile device; etc.

According to specific embodiments where the Kontera Proxy 404 (or Kontera Server System) receives only the URL request information from the WAP/WEB server system, the Kontera Server 404 (or Kontera Server System) may request portions of web/WAP page content (corresponding to the requested URL) from the WAP/WEB server system 406 and/or other systems.

As shown at (5), the Kontera Proxy may send at least a portion of the web/WAP page content to the Kontera Server System for analysis. According to one embodiment, as the Kontera Server System 404 receives the web/WAP page content, it analyzes (7), in real-time, the received web/WAP page content, and generates (9) modified page content which may include one or more ContentLinks (and/or other types of dynamically marked up content relating to one or more advertisements).

According to specific embodiments, at least a portion of the ContentLink information (and/or other related information) may be generated using a variety of conventional on-line contextual advertising techniques such as, for example, those described in: U.S. patent application Ser. No. 10/977,352 (U.S. Publication No. US20050149395A1) previously incorporated by reference; and/or U.S. patent application Ser. No. 10/645,313 (U.S. Publication No. US20050004909A1) herein incorporated by reference in its entirety for all purposes.

In at least one implementation, the Kontera Server System may continue to process the web/WAP page content for the specified URL until it has generated a sufficient amount of ContentLinks, and/or until the entirety of the web/WAP page content has been analyzed.

In at least one embodiment, the modified page content may also include page modification instructions which, for example, may describe how specific text and/or other content is to appear when displayed, and/or may also include other information relating to one or more hyperlinks (e.g., ContentLinks) of the modified page content such as, for example: title information relating to a selected ad, content relating to the ad, a "click" URL that is to be accessed when the user clicks on the ad, a "landing" URL where the user will eventually be redirected to after the click URL action has been processed, etc.

As shown at (11), the Kontera Server System 404 may send at least a portion of the modified page content (which, for example, includes generated ContentLink information) to the Kontera Proxy 408. As shown at (13) the Kontera Proxy may forward the modified page content to the mobile device 402.

According to specific embodiments, communications exchanged between the mobile device and the Kontera Proxy may occur asynchronously from communications exchanged between the Kontera Proxy and Kontera Server System. Additionally, in at least some embodiments, communications exchanged between the Kontera Proxy and the Kontera Server System may occur asynchronously from communications exchanged between the WAP/WEB Server and either the Kontera Proxy or Kontera Server System.

As shown at (15), the mobile device may render the modified page content for display on a display at the mobile device. In at least one embodiment, the modified page content may include various types of data such as, for example, HTML, XML, XHTML, RSS, etc., and a browser application running at the mobile device may be operable to render the modified page content/data for display on the mobile device display. In some embodiments, the mobile device may be operable to processes the page modification instructions to thereby display modified page content formatted in accordance with the web page modification instructions. In other embodiments, the Kontera Server System 404 or Kontera Proxy408 may perform the task of modifying the original web/WAP page content to thereby generate the modified page content, which may then be transmitted to the mobile device for display.

Because the web page modification operations are implemented automatically, in real-time, and without significant delay, such modifications may be performed transparently to the user. Thus, for example, from the user's perspective, when the user requests a particular web page to be retrieved and displayed on the mobile device, the mobile device will respond by displaying modified page content which not only includes the original web/WAP page content, but also includes additional contextual ad information.

In the embodiment of FIG. 4A, it is assumed (for illustrative purposes) that the displayed modified page content includes at least one ContentLink. An example of this is illustrated in FIG. 6A of the drawings.

Figure 6A:
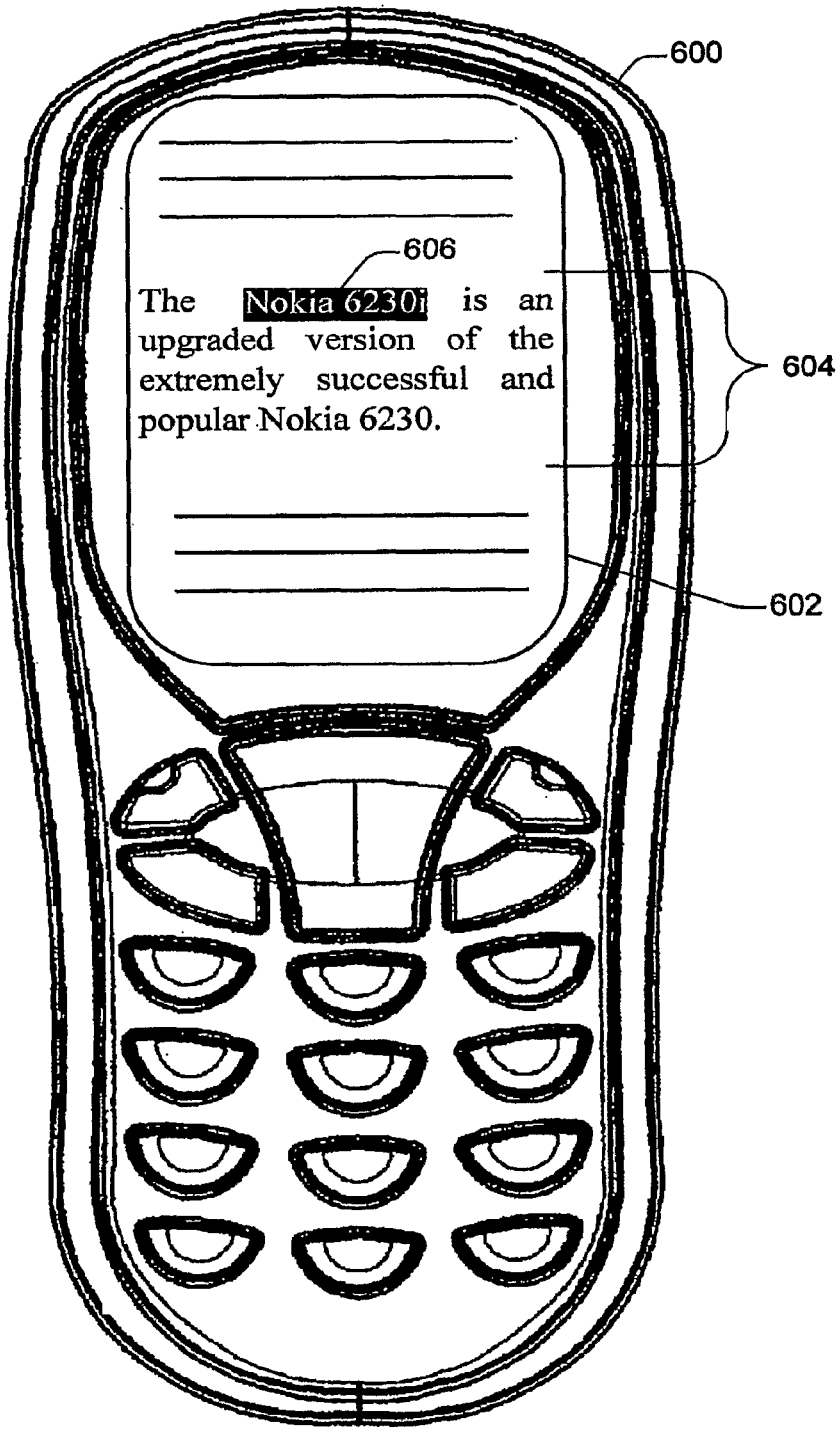
FIGS. 6A-C show different examples of various contextual advertising information which may be displayed on a mobile device display.
Figure 6B:
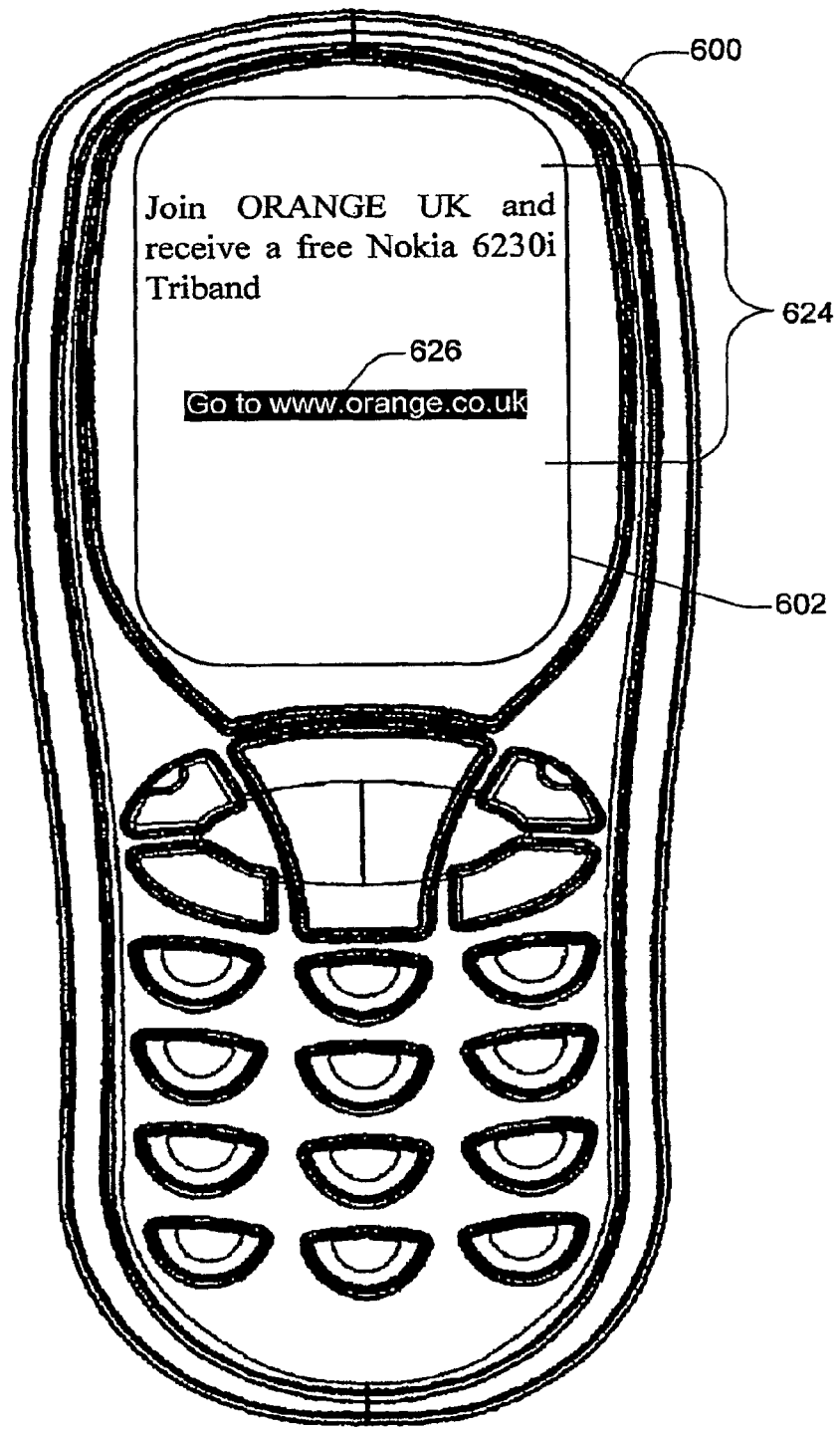
Figure 6C:
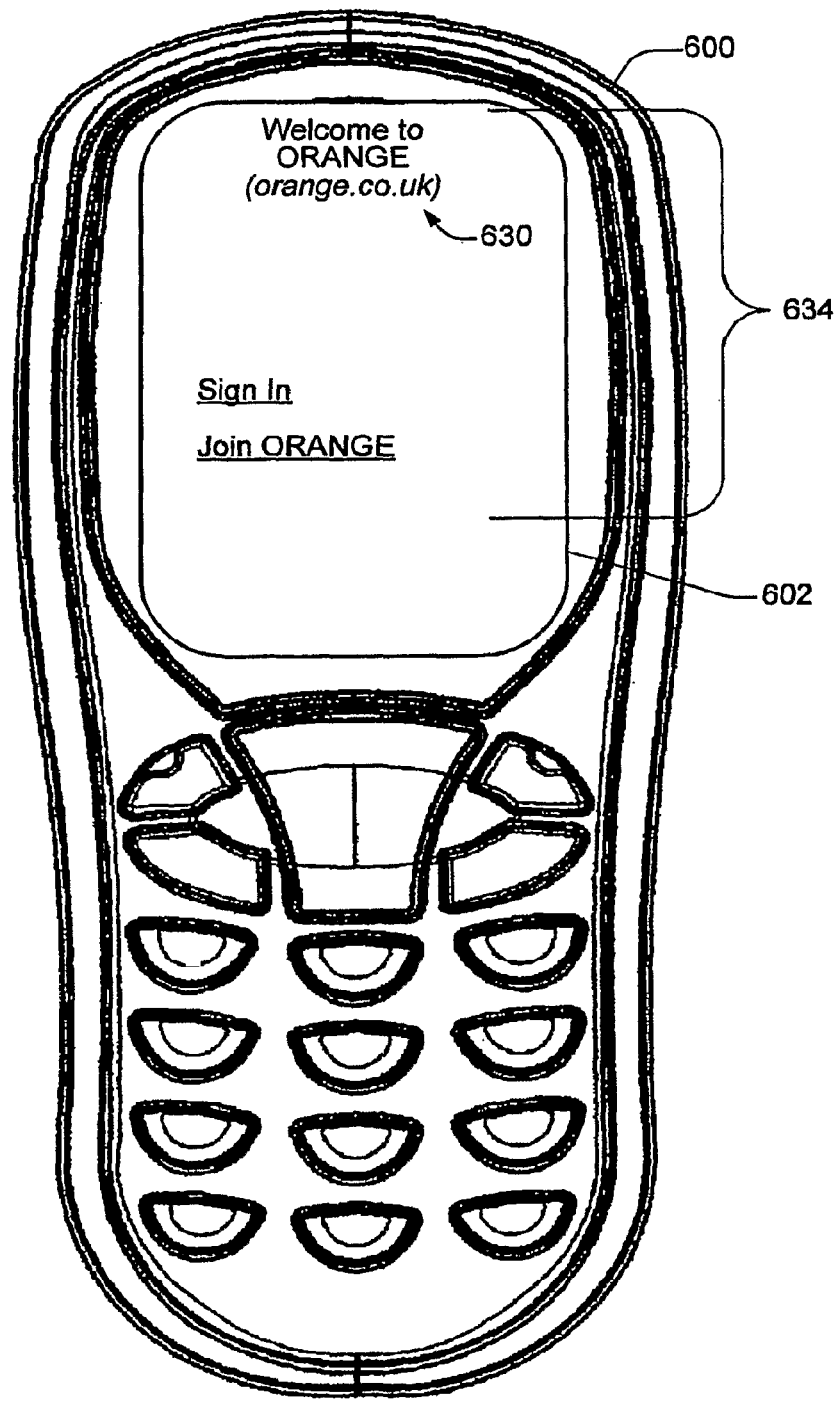

FIGS. 6A-C show different examples of various contextual advertising information which may be displayed on a mobile device display.

For purposes of illustration, the contextual analysis, markup and display techniques disclosed herein are described by way of example with respect to online advertising based implementations. However, it will be appreciated that at least a portion of the contextual analysis, markup and/or display techniques disclosed herein may be utilized for purposes or applications such as, for example: presenting links and/or other information which is determined to be related to selected content (such as, for example, a web page, a document, a URL, a portion of text, etc.); presenting information and/or links relating to definitions, synonyms, antonyms, abbreviations, etc. of selected subject matter; presenting links and/or thumbnails relating to selected web sites, pictures, documents; etc.

FIG. 6A shows an example embodiment of a mobile device 600 which is displaying a portion of modified page content (e.g., 604) on display 602. As illustrated in the embodiment of FIG. 6A, modified page content portion 604 includes a first ContentLink 606. According to one embodiment, the process of generating ContentLink 606 may include a number of different operations such as, for example: identifying and selecting a portion of text (e.g., "Nokia 6230i") included in the original web/WAP page content, identifying a first ad or advertisement to be associated with the selected portion of text, converting the selected portion of text (e.g., "Nokia 6230i") into a hyperlink, and/or associating the hyperlink with one or more characteristics relating to the first ad such as, for example: content relating to the ad, a "click" URL that is to be accessed when the user clicks on the ad, a "landing" URL where the user will eventually be redirected to after the click URL action has been processed, etc. In at least one embodiment, the selected portion of text (e.g., "Nokia 6230i") may correspond to a keyword which has been identified by an advertiser and/or ad campaign provider as being related to one or more types of advertising categories and/or topics.

In the embodiment of FIG. 6A, ContentLink 606 is displayed as highlighted portion of text, for example, to indicate its status as a selectable or clickable hyperlink. In other embodiments, the appearance and/or formatting characteristics of ContentLink 606 may vary, as desired. For example, in some embodiments, an ContentLink may be displayed using different color font, may be displayed using special formatting (e.g., italics, bold, shadow, etc.), may be underlined or double underlined, and/or may be presented using other presentation and/or formatting characteristics which result in the ContentLink portion of content having a different visual appearance than that of adjacent non-ContentLink content.

For purposes of illustration, the flow diagram of FIG. 4A, will continue to be described by way of example with reference to FIGS. 6A-C of the drawings.

It is assumed at (17) (FIG. 4A) that the user of the mobile device selects (e.g., click on) one of the displayed ContentLinks (e.g., user selects of clicks on ContentLink 606, FIG. 6).

In at least one embodiment, the action of the user selecting or clicking on a specific ContentLink (e.g., ContentLink 606) causes the mobile device to transmit (19) a URL request and/or other information relating to the selected ContentLink to the Kontera Proxy, Kontera Server System, and/or other server system. For example, in one embodiment, the mobile device's browser application may be forwarded to a redirect server (not shown) which may redirect the mobile device to a selected destination page. In at least one embodiment, the URL request/ContentLink information may be forwarded (e.g., from the Kontera Proxy) to the Kontera Server System, where the URL and/or other information relating to the user's actions may be logged for subsequent analysis. In one embodiment, ContentLink information sent from the mobile device to the Kontera Proxy or Kontera Server System may include information allowing the Kontera Proxy and/or Kontera Server System to identify various information about the selected ad, such as, for example: the identity of the sponsoring advertiser, the keywords(s) associated with the ad, the ad type, etc.

As shown at (21) the Kontera Server System may utilize the URL request and/or associated ContentLink information to generate an Ad page (and/or other Ad content relating to the selected ContentLink) to be displayed at the mobile device. According to specific embodiments, the Ad page may be automatically and dynamically generated by the Kontera Proxy or Kontera Server System, and/or may also be hosted at the Kontera Proxy and/or Kontera Server System.

At (23) the Kontera Server System (or, in other embodiments, the Kontera Proxy) transmits the Ad page/Ad content to the mobile device for display (25) on the mobile device display. This is illustrated, for example, in FIG. 6B of the drawings.

As shown in the example of FIG. 6B, an Ad (which, for example, includes Ad content portion 624) may be displayed on the mobile device in response to the user selecting ContentLink 606 (FIG. 6A). In one embodiment, Ad content portion 624 may be dynamically and automatically generated by the Kontera Proxy (or Kontera Server System) in response to the user selecting ContentLink 606 (FIG. 6A).

As shown in the example of FIG. 6B, Ad content portion 624 includes an embedded link or hyperlink 626. In at least one embodiment, when the user selects (27) (e.g., clicks on) the displayed hyperlink 626, the mobile device may transmit (29) information relating to the click event (which, for example, may include the landing URL) to the Kontera Proxy, Kontera Server System, and/or other server system.

As shown at (31) the Kontera Server System may log click event information, and may generate a redirect message to be transmitted (e.g., 33) to the mobile device for redirecting (e.g., 35) the mobile device to an appropriate landing URL (e.g., the advertiser's site www.orange.co.uk, or to another site selected by the advertiser). In other embodiments, at leased a portion of this process may be implemented at the Kontera Proxy 408. In one embodiment, the click event information may be forwarded (e.g., from the Kontera Proxy) to the Kontera Server System, where the click event information may be logged for subsequent analysis. In other embodiments, a redirect server (not shown) may be used to redirect the mobile device to the appropriate landing URL.

Thus, for example, when the user selects or clicks on link 626, the mobile device may be redirected to the advertiser's website (e.g., www.orange.co.uk), whereupon the advertiser's associated web/WAP page (or portion thereof, e.g., 634) may be displayed at the mobile device, as illustrated, for example, in FIG. 6C.

It will be appreciated that other embodiments of non-scripting solution procedures may be implemented without use of the Kontera Proxy. An example of this is illustrated in FIG. 4B of the drawings.

In the example of FIG. 4B, it is assumed at (A) that a user at the mobile device 402 has initiated a URL request to view a particular web page or WAP page which, for example, is being hosted at WEB/WAP Server 406.

As shown in the example of FIG. 4B, the URL request may routed to the WEB/WAP Server 406, which may forward (B) the URL request (and/or other information) to Kontera Server System 404. In an alternate embodiment, the mobile device may be redirected to communicate directly with the Kontera Server System.

In at least one embodiment, the Kontera Server System may attempt to determine the features, services and/or other capabilities which are currently enabled at the mobile device. For example, in one embodiment, the Kontera Server System may attempt to determine (C) whether client side scripting functionality is enabled at the mobile device.

In one embodiment, in order to determine whether the mobile device supports client side scripting functionality, the Kontera Server System may transmit to the mobile device a portion of content which includes scripting instructions (e.g., JavaScript) intended for execution at the mobile device. According to a specific embodiment, this communication from the Kontera Server System may be characterized to appear to the mobile device as a legitimate response to the URL request. In one embodiment, the Kontera Server System may spoof the WEB/WAP Server 406, making the communication to the mobile device appear as though it was sent from the WEB/WAP Server 406.

In one embodiment, the scripting instructions may include instructions for transmitting a reply message to the Kontera Server System (and/or other systems). Thus, for example, if the mobile device supports client side scripting functionality, execution of the scripting instructions will cause the mobile device to automatically transmit a reply message to the Kontera Server System. If the mobile device does not support client side scripting functionality, the scripting instructions will not be executed, and no reply message will be sent to the Kontera Server System.

In at least one embodiment, if the Kontera Server System does not receive the expected reply message from the mobile device within a predetermined time period (e.g., relative to when the scripting instructions were sent to the mobile device), the Kontera Server System may determine that the mobile device is not currently capable of supporting client side scripting functionality. Alternatively, if the expected reply message from the mobile device is received at the Kontera Server System, the Kontera Server System may determine that the mobile device is currently capable of supporting client side scripting functionality.

In one embodiment, if it is determined that client side scripting functionality is currently enabled at the mobile device, a scripting-type solution procedure (such as that illustrated, for example, in FIG. 5) may be implemented (D1) at the Kontera Server System. If it is determined that client side scripting functionality is not currently enabled at the mobile device (or if it can not be determined whether client side scripting functionality is currently enabled at the mobile device) a non-scripting type solution procedure (such as that illustrated, for example, in FIG. 4A) may be implemented (D2). In embodiments where no Kontera Proxy is used, the Kontera Server System may be operable to perform at least a portion of the operations which, for example, were performed at the Kontera Proxy 408 of FIG. 4A.

FIG. 5 shows flow diagram of a Scripting Solution Procedure 500 illustrating various information flows and processes which may occur at various systems in accordance with a specific embodiment. In at least one embodiment, the Scripting Solution Procedure 500 of FIG. 5 may be implemented in response to a determination that an identified mobile device is able to support client side scripting operations (such as, for example, JavaScript™) implemented in connection with the device's browser application.

According to some embodiments, at least some features relating to the real-time contextual advertising techniques described herein may be implemented via the use of dynamic context tags which have been included in selected web pages of an online publisher or content provider. For example, in at least one embodiment, a content provider (such as, for example, on-line publishers or other website operators providing on-line content) may insert one or more dynamic context tags (such as, for example, a Java script tag) into all or selected web pages of a website which, for example, may be hosted by the content provider. In one embodiment, the dynamic context tag information may include a content provider ID which is uniquely associated with that specific content provider. According to a specific embodiment, a dynamic context tag may include various information such as, for example, the content provider ID, information relating to one or more desired ad types (such as, for example, ContentLink, Related Content Links, etc.) to be used on the associated web/WAP page, script instructions (e.g., JavaScript™ code) to be implemented at the mobile device; etc. In one embodiment, the dynamic context tag may be physically inserted into each of the selected web pages. Alternatively, the dynamic context tag information may be inserted into the page via a tag that is already all the page such as, for example, and ad server tag or an application server tag. Once present on the page, the dynamic context tag may be served as part of the page that is served from the content provider's web server(s).

In the example of FIG. 5, it is assumed at (2) that a user at the mobile device 502 has initiated a URL request to view a particular web page or WAP page (such as, for example, www.mobile.yahoo.com), which, for example, is being hosted at web server system and/or WAP server system (herein web/WAP server system) 506. Such a request may be initiated, for example, via the Internet using an Internet browser application running at the mobile device 502.

When the URL request is received at the web/WAP server system 506, the web/WAP server system may respond by transmitting or serving (4) to the mobile device the requested web/WAP page content, which, for example, may include a dynamic context tag containing script instructions (and/or other executable code).

As shown at (6) it is assumed that the web/WAP page content and dynamic context tag information are received at the mobile device. In at least one embodiment, the script instructions may include instructions or code intended for execution at the mobile device which, for example, may cause the mobile device to initiate communication with a remote system such as, for example, the Kontera Server System 504. More specifically, in the example of FIG. 5, it is assumed that the mobile device has initiated processing of the dynamic context tag information which invokes execution (6) of the script instructions which, in turn, causes the mobile device to transmit (8) all or selected portions of the web/WAP page content (and/or other information such as, for example, the content provider ID, desired ad type information, etc.) to the Kontera Server System for contextual advertising analysis.

Additionally, in at least one embodiment, the mobile device may also be caused to transmit mobile device capability information to the Kontera Server System 504. In one embodiment, the mobile device capability information may include information relating to various features, services, and/or capabilities which are supported and/or enabled at the mobile device 502 such as, for example, whether the mobile device is configured to support client side scripting; whether the mobile device is configured to support advanced display features such as, for example, advance HTML features (such as, for example, functionality for displaying mouse-over tool tip layers within the mobile device's browser application), rich media features (e.g., Flash plugin), video, etc.

In at least some embodiments, the features, services, and/or capabilities which are supported and/or currently enabled at the mobile device may determine the types of ads that may be displayed at the mobile device, and may also determine selection of specific procedural flows which may be implemented for causing contextually relevant ad information to be displayed at the mobile device. In at least one embodiment, the mobile device capability information may be periodically updated, for example, in order to determine whether specific features are currently enabled at the mobile device. For example, if the updated mobile device capability information reveals that the feature of client side scripting has been disabled at a mobile device, the Kontera Server System may respond by initiating a non-scripting based contextual advertising procedure (e.g., such as that illustrated in FIG. 4A) for that mobile device. Similarly, if the updated mobile device capability information reveals that the feature of client side scripting has been enabled at the mobile device, the Kontera Server System may respond by initiating a scripting based contextual advertising procedure (e.g., such as that illustrated in FIG. 5) for that mobile device.

Returning to FIG. 5, in at least one embodiment, as the Kontera Server System 504 receives the web/WAP page content, it analyzes (10) (e.g., in real-time) the received web/WAP page content, and generates (12) page modification instructions which includes ContentLink data relating to one or more ContentLink(s) to be displayed on the mobile device display.

In at least one embodiment, the Kontera Server System may be operable to use the mobile device capability information in generating the appropriate page modification instructions to be send to the mobile device 502. For example, in one embodiment, if it is determined that mobile device is currently configured to support functionality for displaying mouse-over tool tip layers, a first set of page modification instructions may be generated which includes instructions for implementing ContentLinks using mouse-over tool tip layer functionality. If it is determined that mobile device is currently not configured to support functionality for displaying mouse-over tool tip layers, a second set of page modification instructions may be generated which includes instructions for implementing ContentLinks without using mouse-over tool tip layer functionality.

According to specific embodiments, at least a portion of the page modification instructions and/or ContentLink data may be generated using a variety of conventional on-line contextual advertising techniques such as, for example, those described in: U.S. patent application Ser. No. 10/977,352 (U.S. Publication No. US20050149395A1), and/or U.S. patent application Ser. No. 10/645,313 (U.S. Publication No. US20050004909A1), each of which has previously been incorporated by reference.

In at least one implementation, the Kontera Server System may continue to process the web/WAP page content until it has generated a sufficient amount of page modification instructions, ContentLink data, and/or until the entirety of the web/WAP page content has been analyzed.

In at least one embodiment, the page modification instructions and/or ContentLink data may include various information such as, for example: information which describes how specific text and/or other content (e.g., of the web/WAP page content) is to appear when displayed; information relating to one or more hyperlinks (e.g., ContentLinks) to be included in the display of the web/WAP page content; information relating to specific advertisements which are associated with one or more ContentLinks such as, for example: title information relating to a selected ad, content relating to the ad, a "click" URL that is to be accessed when the user clicks on the ad, a "landing" URL where the user will eventually be redirected to after the click URL action has been processed, etc.

As shown at (14), the Kontera Server System 504 may send the page modification instructions and/or ContentLink data to the mobile device 502.

As shown at (16) the mobile device may use the page modification instructions and/or ContentLink data to display modified page content which includes at least one ContentLink (as shown, for example, in FIG. 6A of the drawings). According to one embodiment, a browser application running at the mobile device may be operable to modify the web/WAP page content using the page modification instructions and/or ContentLink data to thereby render modified page content for display on the mobile device display. In some embodiments, the mobile device may be operable to processes the page modification instructions to thereby display modified page content formatted in accordance with the web page modification instructions. In other embodiments, the Kontera Server System may perform the task of modifying the original web/WAP page content to thereby generate the modified page content, which may then be transmitted to the mobile device for display.

Because the web page modification operations are implemented automatically, in real-time, and without significant delay, such modifications may be performed transparently to the user. Thus, for example, from the user's perspective, when the user requests a particular web page to be retrieved and displayed on the mobile device, the mobile device will respond by displaying modified page content which not only includes the original web/WAP page content, but also includes additional contextual ad information.

In the embodiment of FIG. 5, it is assumed (for illustrative purposes) that the displayed modified page content includes at least one ContentLink as shown, for example, in FIG. 6A of the drawings. For purposes of illustration, the flow diagram of FIG. 5, will continue to be described by way of example with reference to FIGS. 6A-C of the drawings.

As illustrated in the embodiment of FIG. 6A, modified page content portion 604 includes a first ContentLink 606. According to one embodiment, the process of generating ContentLink 606 may include a number of different operations such as, for example: identifying and selecting a portion of text (e.g., "Nokia 6230i") included in the original web/WAP page content, identifying a first ad or advertisement to be associated with the selected portion of text, converting the selected portion of text (e.g., "Nokia 6230i") into a hyperlink, and/or associating the hyperlink with one or more characteristics relating to the first ad such as, for example: content relating to the ad, a "click" URL that is to be accessed when the user clicks on the ad, a "landing" URL where the user will eventually be redirected to after the click URL action has been processed, etc. In at least one embodiment, the selected portion of text (e.g., "Nokia 6230i") may correspond to a keyword which has been identified by an advertiser and/or ad campaign provider as being related to one or more types of advertising categories and/or topics.

It is assumed at (18) (FIG. 5) that the user of the mobile device selects (e.g., click on) one of the displayed ContentLinks (e.g., user selects of clicks on ContentLink 606, FIG. 6).

In at least one embodiment, the action of the user selecting or clicking on a specific ContentLink (e.g., ContentLink 606) causes the mobile device to transmit (20) a URL request and/or other information relating to the selected ContentLink to the Kontera Server System. In one embodiment, ContentLink information sent from the mobile device to the Kontera Server System may include information allowing the Kontera Server System to identify various information about the selected ad, such as, for example: the identity of the sponsoring advertiser, the keywords(s) associated with the ad, the ad type, etc. In one embodiment, information relating to the URL request and/or other information relating to the user's actions may be logged by the Kontera Server System for subsequent analysis.

As shown at (22) the Kontera Server System may utilize the URL request and/or associated ContentLink information to generate an Ad page (and/or other Ad content relating to the selected ContentLink) to be displayed at the mobile device. According to specific embodiments, the Ad page may be automatically and dynamically generated by the Kontera Server System, and/or may also be hosted at the Kontera Server System.

At (24) the Kontera Server System may transmit the Ad page/Ad content to the mobile device where it may then be displayed (26) on the mobile device display. This is illustrated, for example, in FIG. 6B of the drawings.

As shown in the example of FIG. 6B, an Ad (which, for example, includes Ad content portion 624) may be displayed on the mobile device in response to the user selecting ContentLink 606 (FIG. 6A). In one embodiment, Ad content portion 624 may be dynamically and automatically generated by the Kontera Server System in response to the user selecting ContentLink 606 (FIG. 6A).

As shown in the example of FIG. 6B, Ad content portion 624 includes an embedded link or hyperlink 626. In at least one embodiment, when the user selects (e.g., clicks on) the displayed hyperlink 626, the mobile device may transmit (30) information relating to the click event (which, for example, may include the landing URL) to the Kontera Server System and/or other system(s).

As shown at (32) the Kontera Server System may log click event information, and may generate a redirect message to be transmitted (e.g., 34) to the mobile device for redirecting (e.g., 36) the mobile device to an appropriate landing URL (e.g., the advertiser's site www.orange.co.uk, or to another site selected by the advertiser). In other embodiments, a redirect server (not shown) may be used to redirect the mobile device to an appropriate landing URL.

Thus, for example, when the user selects or clicks on link 626, the mobile device may be redirected to the advertiser's website (e.g., www.orange.co.uk), whereupon the advertiser's associated web/WAP page (or portion thereof, e.g., 634) may be displayed at the mobile device, as illustrated, for example, in FIG. 6C.

In at least some embodiments, communications between a mobile device and a WAP/WEB Server may be routed via various gateways such as, for example, a service provider or carrier gateway (which, for example, may provide Internet access to the mobile device), a publisher or content provider gateway (which, for example, may provide access to one or more specific web servers or WAP servers, etc.

FIGS. 9B and 9B illustrate examples of specific embodiments of different procedural flows which may be utilized for implementing various features described or referenced herein.

FIG. 9B illustrates an example embodiment of a procedural flow which may be utilized in embodiments involving a content provider gateway or publisher gateway.

In the example of FIG. 9B, it is assumed at (71) that a user at the mobile device 952 has initiated a URL request to view a particular web page or WAP page which, for example, is being hosted at WEB/WAP Server 956. In this example, it is also assumed that access to WEB/WAP Server 956 is provided via publisher gateway (PUB GATEWAY) 960.

Accordingly, as shown in the example of FIG. 9B, the URL request may routed to the PUB GATEWAY 960, which may forward (73) the URL request (and/or other information such as, for example, information relating to the mobile device and/or its capabilities/features) to Kontera Server System 954.

In at least one embodiment, when appropriate, the Kontera Server System may attempt to determine (75) the features, services and/or other capabilities which are currently enabled at the mobile device. For example, in one embodiment, the Kontera Server System may attempt to determine whether client side scripting functionality is enabled at the mobile device.

In one embodiment, if it is determined that client side scripting functionality is currently enabled at the mobile device, a scripting-type solution procedure (such as that illustrated, for example, in FIG. 5) may be implemented (79a). If it is determined that client side scripting functionality is not currently enabled at the mobile device (or if it can not be determined whether client side scripting functionality is currently enabled at the mobile device) a non-scripting type solution procedure (such as that illustrated, for example, in FIG. 4A) may be implemented (79b).

FIG. 9B illustrates an example embodiment of a procedural flow which may be utilized in embodiments involving a carrier gateway or service provider gateway.

In the example of FIG. 9B, it is assumed at (81) that a user at the mobile device 952 has initiated a URL request to view a particular web page or WAP page which, for example, is being hosted at WEB/WAP Server 956. In this example, it is also assumed that Internet access for the mobile device 952 is provided via service provider gateway 960.

Accordingly, as shown in the example of FIG. 9B, the URL request may routed to the service provider gateway 960, which may forward (83) the URL request (and/or other information such as, for example, information relating to the mobile device and/or its capabilities/features) to Kontera Server System 954.

In at least one embodiment, when appropriate, the Kontera Server System may attempt to determine (85) the features, services and/or other capabilities which are currently enabled at the mobile device. For example, in one embodiment, the Kontera Server System may attempt to determine whether client side scripting functionality is enabled at the mobile device.

In one embodiment, if it is determined that client side scripting functionality is currently enabled at the mobile device, a scripting-type solution procedure (such as that illustrated, for example, in FIG. 5) may be implemented (89a). If it is determined that client side scripting functionality is not currently enabled at the mobile device (or if it can not be determined whether client side scripting functionality is currently enabled at the mobile device) a non-scripting type solution procedure (such as that illustrated, for example, in FIG. 4A) may be implemented (89b).

Other Embodiments

Generally, the contextual information delivery techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the contextual information delivery technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. A general architecture for some of these machines will appear from the description given below. In an alternative embodiment, the contextual information delivery technique of this invention may be implemented on a general-purpose network host machine such as a personal computer or workstation. Further, the invention may be at least partially implemented on a card (e.g., an interface card) for a network device or a general-purpose computing device.

Referring now to FIG. 7, a network device 60 suitable for implementing at least a portion of the contextual information delivery techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a network server, the CPU 62 may be responsible for analyzing packets, encapsulating packets, forwarding packets to appropriate network devices, analyzing web page content, generating web page modification instructions, etc. The CPU 62 preferably accomplishes all these functions under the control of software including an operating system (e.g. Windows NT), and any appropriate applications software.

CPU 62 may include one or more processors 63 such as a processor from the Motorola or Intel family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the contextual information delivery techniques described herein. The program instructions may control the operation of an operating system and/or one or more applications, for example. The memory or memories may also be configured to store data structures, keyword taxonomy information, advertisement information, user click and impression information, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as described herein defined in the appended claims.

It is claimed:

1. A method comprising:
receiving at a proxy mechanism a request from a mobile device to access web page content;
based on the receiving of the request, transmitting from the proxy mechanism a communication to the mobile device, the communication including scripting instructions instructing the mobile device to transmit a reply message to the proxy mechanism;
based on a receiving of the reply message at the proxy mechanism, determining that the mobile device supports client side scripting functionality;
based on the determining that the mobile device supports client-side scripting, performing operations including:
based on an examination of information in the reply message indicating that the mobile device supports an advanced display feature, marking up the web page content based on a scripting solution procedure that uses a contextual advertising markup technique that takes advantage of the advanced display feature; and
based on an examination of the information in the reply message indicating that the mobile device does not support the advanced display feature, marking up the web page content based on a scripting solution procedure that does not use the contextual advertising markup technique that takes advantage of the advanced display feature; and
communicating the marked-up web page content from the proxy mechanism to the mobile device in response to the receiving of the request at the proxy mechanism from the mobile device to access the web page content.

2. The method of claim 1 further comprising:
selecting a portion the web page content, the portion corresponding contextual information provided by a campaign provider; and wherein the marking up of the web page content based on the scripting solution procedure that uses the contextual advertising markup technique that takes advantage of the advanced display feature or the marking up of the web page content based on the scripting solution procedure that does not use the contextual advertising markup technique that takes advantage of the advanced display feature is performed on the portion.

3. The method of claim 1, wherein the advanced feature is one of an advanced HTML functionality, a rich media functionality, or a video playback functionality.

4. The method of claim 1, wherein
the information is included in a header portion of the reply message.

5. The method of claim 1, further comprising:
- based on a failure to receive the reply message at the proxy mechanism, determining that the mobile device does not support client side scripting functionality; and
- based on the determining that the mobile device does not support client-side scripting, marking up the web page content based on a non-scripting solution procedure.

6. The method of claim 5, wherein the marking up of the web page content includes generating a ContentLink for inclusion in the web page, the ContentLink causing the mobile device to send ContentLink information to the proxy mechanism based on an activation of the ContentLink by a user.

7. The method of claim 6, wherein the ContentLink information allows the proxy mechanism to determine at least one of an identity of a sponsor of an advertisement, a keyword associated with the advertisement, and a type of the advertisement.

8. The method of claim 7, the method further comprising generating an advertisement page at the proxy mechanism for displaying the advertisement on the mobile device, the generating based on the ContentLink information.

9. The method of claim 1, wherein the examination of the information in the reply message indicating that the mobile device supports an advanced display feature is based on querying a device capabilities database using the information in the reply message.

10. The method of claim 9, wherein the information includes at least one of a serial number, type identifier, make identifier, or model identifier of the mobile device.

11. A system comprising:
- at least one processor;
- a non-transitory machine readable memory storing a set of instructions that, when executed by the at least one processor, causes the at least one processor to, at least:
  - receive at a proxy mechanism a request from a mobile device to access web page content;
  - based on the receiving of the request, transmit from the proxy mechanism a communication to the mobile device, the communication including scripting instructions instructing the mobile device to transmit a reply message to the proxy mechanism;
  - based on a receiving of the reply message at the proxy mechanism, determine that the mobile device supports client side scripting functionality;
  - based on the determining that the mobile device supports client-side scripting, perform operations including:
    - based on an examination of information in the reply message indicating that the mobile device supports an advanced display feature, mark up the web page content based on a scripting solution procedure that uses a contextual advertising markup technique that takes advantage of the advanced display feature; and
    - based on an examination of the information in the reply message indicating that the mobile device does not support the advanced display feature, mark up the web page content based on a scripting solution procedure that does not use the contextual advertising markup technique that takes advantage of the advanced display feature; and
  - communicate the marked-up web page content from the proxy mechanism to the mobile device in response to the receiving of the request at the proxy mechanism from the mobile device to access the web page content.

12. The system of claim 11, the set of instructions further causing the at least one processor to, at least:
- selecting a portion the web page content, the portion corresponding contextual information provided by a campaign provider; and wherein the marking up of the web page content based on the scripting solution procedure that uses the contextual advertising markup technique that takes advantage of the advanced display feature or the marking up of the web page content based on the scripting solution procedure that does not use the contextual advertising markup technique that takes advantage of the advanced display feature is performed on the portion.

13. The system of claim 11,
wherein the advanced display feature is one of an advanced HTML functionality, a rich media functionality, and a video playback functionality.

14. The system of claim 11, the set of instructions further causing the at least one processor to, at least:
- the information is included in a header portion of the reply message.

* * * * *